US011981816B2

(12) United States Patent
Duez et al.

(10) Patent No.: US 11,981,816 B2
(45) Date of Patent: May 14, 2024

(54) RUBBER COMPOSITION WITH DUAL FILLERS REINFORCEMENT

(71) Applicants: The Goodyear Tire & Rubber Company, Akron, OH (US); LUXEMBOURG INSTITUTE OF SCIENCE AND TECHNOLOGY

(72) Inventors: Benoit Duez, Mamer (LU); Pascal Patrick Steiner, Vichten (LU); Philippe Schmit, Chantemelle (BE); Georges Marcel Victor Thielen, Schouweiler (LU); Ahilan Manisekaran, Esch-sur-Alzette (LU); Jean-Sébastien Thomann, Esch-sur-Alzette (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 123 days.

(21) Appl. No.: 17/814,970

(22) Filed: Jul. 26, 2022

(65) Prior Publication Data
US 2024/0043663 A1    Feb. 8, 2024

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01)

(58) Field of Classification Search
CPC .................................... C08L 9/06; B60C 1/00
USPC ......................................................... 524/76
See application file for complete search history.

(56) References Cited

U.S. PATENT DOCUMENTS

| 9,102,801 B1 | 8/2015 | Dirk et al. |
| 9,205,704 B2 | 12/2015 | Sandstrom et al. |
| 2010/0204368 A1 | 8/2010 | Benko et al. |
| 2019/0232718 A1 | 8/2019 | Halasa et al. |

FOREIGN PATENT DOCUMENTS

WO    WO-2019131397 A1 *  7/2019    .............. B60C 1/00

OTHER PUBLICATIONS

Barana et al., Influence of lignin features on thermal stability and mechanical properties of natural rubber compounds, ACS Sustainable Chemistry & Engineering, 2016, 34 pages, ACS Paragon Plus Environment, ACS Publications, American Chemical Society.
Barana et al., Lignin based functional additives for natural rubber, ACS Sustainable Chemistry & Engineering, 2018, 34 pages, ACS Paragon Plus Environment, ACS Publications, American Chemical Society.
Dessbesell et al., Global lignin supply overview and kraft lignin potential as an alternative for petroleum-based polymers, Renewable and Sustainable Energy Reviews 123, 2020, http://www.elsevier.com/locate/rser, 109768, Elsevier Ltd.
Flory et al., Statistical Mechanics of CrossLinked Polymer Networks II. Swelling, The Journal of Chemical Physics, 1943, 7 pages, vol. 11, No. 11.
Gillet et al., Lignin Transformations for High Value Applications: Towards Targeted Modifications Using Green Chemistry, Green Chemistry Accepted Manuscript, 2017, pp. 1-31, 00, Royal Society of Chemistry.
Hait et al., Treasuring waste lignin as superior reinforcing filler in high cispolybutadiene rubber: A direct comparative study with standard reinforcing silica and carbon black, Journal of Cleaner Production 299, 2021, pp. 1-12, 126841, Elsevier Ltd.
Kocun et al., Fast, High Resolution and Wide Modulus Range Nanomechanical Mapping with Bimodal Tapping Mode, ACS Nano, 2017, pp. 1-30.
Košíková et al., Sulfur-Free Lignin as Reinforcing Component of Styrene-Butadiene Rubber, Institute of Chemistry, 2005, pp. 924-929, vol. 97, Journal of Applied Polymer Science,.
Labuda et al., Generalized Hertz model for bimodal nanomechanical mapping, Beilstein J. Nanotechnol, 2016,, pp. 970-985, 7.
Yearla et al., Preparation and characterisation of lignin nanoparticles: evaluation of their potential as antioxidants and UV protectants, Journal of Experimental Nanoscience, 2016, 15 pages, vol. 11, No. 4, Taylor & Francis.
Zou et al., Polymer/Silica Nanocomposites: Preparation, Characterization, Properties, and Applications, Chemical Reviews, 2008, pp. 3893-3957, vol. 108, No. 9, American Chemical Society.

* cited by examiner

*Primary Examiner* — Deve V Hall
(74) *Attorney, Agent, or Firm* — Mandy B. Willis

(57) ABSTRACT

The present disclosure relates to a rubber composition comprising at least rubber, and reinforcement materials, the reinforcement materials comprising silica particles and Kraft lignin nanoparticles, wherein the phr ratio between the silica particles and Kraft lignin nanoparticles is ranging between 3 and 20; wherein the Kraft lignin nanoparticles have an average diameter size ranging between 10 and 100 nm as determined by scanning electron microscopy; and wherein the Kraft lignin nanoparticles have a glass transition temperature of at least 150° C. as determined by Differential Scanning Calorimetry.

20 Claims, 19 Drawing Sheets

RUBBER COMPOSITION WITH DUAL FILLERS REINFORCEMENT

FIELD OF THE INVENTION

The present disclosure relates to rubber compositions, to tires with a tire tread comprising such rubber compositions and to a process for making such rubber compositions.

BACKGROUND OF THE INVENTION

Rubber tires have been widely used in all automobiles, for instance, passenger car tires (PCT).

Tire tread is mainly made of a solution styrene-butadiene rubber (SSBR) with carbon black (CB) or silica fillers. CB is petroleum-based, and its production tremendously impacts carbon footprints.

The extreme dependence on non-renewable resources, the automobile industry being an example of such non-renewable resources, has resulted in drastic climate change, such as excessive greenhouse gas production.

Therefore, silica filler with solution styrene-butadiene rubber (SSBR) has been used to produce green PCT tread, and subsequently improve the impact on the climate. Silica and SSBR combinations are known to enhance the tire traction performance and lower the fuel consumption of automobiles, significantly reducing $CO_2$ emissions, as shown in the reviews made by Zou H. et al., entitled "*Polymer/silica nanocomposites:preparation, characterization, properties and applications*" (*Chem. Rev.*, 2018, 108, 3893-3957). However, silica has the following considerable drawbacks: (i) vast energy consumption and costly production, (ii) silica has poor compatibility with rubbers, and it needs a compatibilizer to avoid mixing problems, (iii) it has a high density, which hinders the development of light-weight tire tread composites, and (iv) covalently bonded silica impacts the devulcanization, making the tire recycling more complex. Thus, there is a critical necessity for silica substitution.

Recent eco-consciousness demands the incorporation of sustainable materials in PCT to develop green PCT, which contributes to reducing greenhouse gases without compromising tire performance.

One of the promising alternatives to non-renewable resources is lignin, as described in the study of Dessbesell L. et al., entitled "*Global lignin supply overview and Kraft lignin potential as an alternative for petroleum-based polymers*" (*Renewable and Sustainable Energy Reviews*, 2020, 123, 109768). Lignin's large availability is the first advantage of using lignin. Indeed, 50 to 70 million tones of lignin are yearly produced as a waste by pulp and biorefineries, this already-huge content is estimated to increase to about 225 million tones/year in 2030.

On top of that, lignin has a variety of functional groups, such as carbonyl, methoxy, carboxylic, and hydroxyl groups. Lignin type varies to the wood source and the pulping process. The awareness of lignin utilization in place of polluting materials has been emerging, as noted in the study of Gillet S. et al., entitled "*Lignin transformations for high-value applications: towards targeted modifications using green chemistry*" (*Green Chemistry*, 2017, 19, 4200-4233).

Thus, for example, Kraft lignin (KL) has been used as a UV absorber, anti-microbial agent, drug delivery carrier, antioxidants, agricultural actives-controlled release additives, adhesives/anti-corrosive coatings, pickering emulsions agents, carbon capture particles, biocarbon fiber, 3D printing additives, filler or blend in composites.

In the search for a silica alternative, few studies have reported the effect of incorporating KL as a reinforcing filler in rubbers, such as the study by Košiková B., et al., entitled "*Sulphur-free lignin as reinforcing component of styrene-butadiene rubber*" (*J. Appl. Polym. Sci.*, 2005, 97, 924-929) or more recently, the study of Hait S., et al., entitled "*Treasuring waste lignin as superior reinforcing filler in high cis-polybutadiene rubber: A direct comparative study with standard reinforcing silica and carbon black*" (*J. of Cleaner Production*, 2021, 299, 126841). In this recent study, it was reported that KL shows a promising reinforcing characteristic when the loading of the filler was around 50 phr. However, the fundamental issue with KL is that it forms massive aggregation in rubber due to its large irregular particles with hydrophilic functional groups and intramolecular hydrogen bonding, as shown in the study by Barana D., et al., entitled "*Influence of lignin features on thermal stability and mechanical properties of natural rubber compounds*" (*ACS Sustainable Chem. Eng.*, 2016, 4, 5258-5267). Massive aggregates further reduce the affinity between lignin and rubber, affecting the overall performance of rubber composite. It was thus recommended that the lignin must be chemically modified to enhance the dispersion and composite properties—see the additional study of Barana D., et al., entitled "*Lignin based functional additives for natural rubber*" (*ACS Sustainable Chem. Eng.*, 2018, 6, 11843-11852).

Nevertheless, the need for lignin functionalization for improving the dispersion of the filler in place and/or in addition of petroleum-based reinforcing fillers, while keeping at high standards the mechanical properties of the rubber composition, still hinders the efficient exploitation of the sustainable green material which is lignin.

There is a need to find a solution to improve the situation.

SUMMARY OF THE INVENTION

According to a first aspect, the present disclosure relates to a rubber composition comprising at least rubber, and reinforcement materials, the reinforcement materials comprising silica particles and Kraft lignin nanoparticles, wherein the phr ratio between the silica particles and Kraft lignin nanoparticles is ranging between 3 and 20; wherein the Kraft lignin nanoparticles have an average diameter size ranging between 10 and 100 nm as determined by scanning electron microscopy/helium ion microscopy; and wherein the Kraft lignin nanoparticles have a glass transition temperature of at least 150° C. as determined by Differential Scanning Calorimetry.

According to a second aspect, the present disclosure relates to a rubber composition comprising at least rubber, one or more process oils, and reinforcement materials, the reinforcement materials comprising silica particles and Kraft lignin nanoparticles, wherein the phr ratio between the silica particles and Kraft lignin nanoparticles is ranging between 3 and 20; wherein the Kraft lignin nanoparticles have a specific surface area ranging between 70 $m^2/g$ and 430 $m^2/g$ as determined by BET experiments; and wherein the Kraft lignin nanoparticles have a glass transition temperature of at least 150° C. as determined by Differential Scanning Calorimetry.

According to a third aspect, the present disclosure relates to a tire with a tire tread, where said tire tread comprises a rubber composition selected from a rubber composition according to the first aspect or a rubber composition according to the second aspect or a mixture of the rubber composition according to the first aspect and the rubber composition according to the second aspect.

According to a fourth aspect, the present disclosure relates to a process for making a rubber composition selected from a rubber composition according to the first aspect or a rubber composition according to the second aspect, said process comprising the steps of
(a) providing at least rubber and one or more reinforcement materials, and optionally one or more process oils;
(b) mixing the rubber with the one or more reinforcement materials and with the optional one or more process oils to obtain a mixture; and
(c) curing said mixture under curing conditions;
wherein said reinforcement materials comprise silica particles and Kraft lignin nanoparticles in a phr ratio between the silica particles and Kraft lignin nanoparticles ranging between 3 and 20, or between 5 and 20,
wherein the Kraft lignin nanoparticles have an average diameter size ranging between 10 and 100 nm as determined by scanning electron microscopy/helium ion microscopy; and wherein the Kraft lignin nanoparticles have a glass transition temperature of at least 150° C. as determined by Differential Scanning Calorimetry.

According to a fifth aspect, the present disclosure relates to a process for making a rubber composition selected from a rubber composition according to the first aspect or a rubber composition according to the second aspect, said process comprising the steps of
(a) providing at least rubber and one or more reinforcement materials, and optionally one or more process oils;
(b) mixing the rubber with the one or more reinforcement materials and with the optional one or more process oils to obtain a mixture; and
(c) curing said mixture under curing conditions;
wherein said reinforcement materials comprise silica particles and Kraft lignin nanoparticles in a phr ratio between the silica particles and Kraft lignin nanoparticles ranging between 3 and 20, or between 5 and 20,
wherein the Kraft lignin nanoparticles have a specific surface area ranging between 70 $m^2/g$ and 430 $m^2/g$ as determined by BET experiments; and wherein the Kraft lignin nanoparticles have a glass transition temperature of at least 150° C. as determined by Differential Scanning Calorimetry.

It has been surprisingly found that the use of Kraft lignin nanoparticles having a glass transition temperature which is superior to the glass transition temperature of the raw Kraft lignin (i.e., 135° C.) and having either an average diameter size ranging between 10 and 100 nm and/or a specific surface area ranging between 70 $m^2/g$ and 430 $m^2/g$ dispersed instantaneously upon mixing with rubber. Therefore, the Kraft lignin nanoparticles can thus be used as reinforcing material in rubber composition already comprising silica as reinforcing material, thus reducing the need for silica. The rubber composition resulting from the compounding of rubber with these dual filler materials has been found to present at least the same level of performance, notably in terms of mechanical properties, as a classical rubber formulation devoid of the green-sustainable lignin. In addition, it has been found that the storage modulus of the rubber composition comprising such particular Kraft lignin nanoparticles has significantly improved.

With preference, the rubber composition further comprises one or more process oils.

For example, the one or more process oils are one or more oils selected from treated distillate aromatic extracts (TDAE), mild extracted solvate (MES) or treated residual aromatic extracts (TRAE). With preference, the process oils are or comprise treated distillate aromatic extracts (TDAE).

For example, the one or more process oils are present in a content ranging between 5 phr and 50 phr, or between 10 phr and 45 phr, or between 15 phr and 40 phr.

For example, the phr ratio between the reinforcement materials and the one or more process oils is ranging between 3.5:1 and 8:1, or 4:1 to 8:1, or 4:1 to 7:1, or 4:1 to 6:1, or 3.5:1 to 6:1.

The following can be used to further define the rubber composition according to the first aspect and the second aspect.

As regards the reinforcement materials

For example, the Kraft lignin nanoparticles have an average diameter size ranging between 10 and below 30 nm as determined by scanning electron microscopy or the Kraft lignin nanoparticles have an average diameter size ranging between 30 and 60 nm as determined by scanning electron microscopy/helium ion microscopy.

For example, the Kraft lignin nanoparticles have a specific surface area ranging between 90 $m^2/g$ and 410 $m^2/g$ as determined by BET experiments, preferably between 100 $m^2/g$ and 400 $m^2/g$.

For example, the Kraft lignin nanoparticles have a specific surface area ranging between 70 $m^2/g$ and 140 $m^2/g$ as determined by BET experiments, preferably between 80 $m^2/g$ and 130 $m^2/g$, more preferably between 90 $m^2/g$ and 120 $m^2/g$, even more preferably between 100 $m^2/g$ and 110 $m^2/g$. Alternatively and for example, the Kraft lignin nanoparticles have a specific surface area ranging between 360 $m^2/g$ and 430 $m^2/g$ as determined by BET experiments, preferably between 370 $m^2/g$ and 420 $m^2/g$, more preferably between 380 $m^2/g$ and 410 $m^2/g$, even more preferably between 390 $m^2/g$ and 400 $m^2/g$.

For example, the Kraft lignin nanoparticles have a glass transition temperature of at least 155° C. as determined by Differential Scanning Calorimetry.

For example, the Kraft lignin nanoparticles have a single glass transition temperature of at least 150° C., or of at least 155° C. Alternatively and for example, the Kraft lignin nanoparticles have a first and a second glass transition temperature with the first glass transition temperature ranging between 110° C. and 130° C., or between 115° C. and 125° C., and the second glass transition temperature of at least 150° C., or of at least 155° C.

For example, the Kraft lignin nanoparticles have a glass transition temperature superior to the glass transition temperature of the Kraft lignin as determined by Differential Scanning Calorimetry.

For example, the Kraft lignin nanoparticles have a Young's modulus ranging between 1.0 GPa and below 3.0 GPa as determined by Atomic Force Microscopy, preferentially between 1.4 GPa and 2.9 GPa, more preferentially between 1.5 GPa and 2.8 GPa, even more preferentially between 1.6 GPa and 2.7 GPa. Alternatively, the Kraft lignin nanoparticles have a Young's modulus ranging between 3.0 GPa and 6.0 GPa, preferentially between 3.2 GPa and 5.1 GPa, more preferentially between 3.4 GPa and 4.9 GPa, even more preferentially between 3.6 GPa and 4.7 GPa.

For example, the Kraft lignin nanoparticles have a transmittance taken at a wavelength of 600 nm ranging between 40% and 80% as determined by absorption analysis.

For example, the Kraft lignin nanoparticles have a three-dimensional structure that comprises at least two types of π-π stacking, as determined by UV-Visible analysis.

For example, the phr ratio between the silica particles and Kraft lignin nanoparticles is ranging between 5 and 20.

For example, the content of silica particles is ranging between 90 phr and 150 phr, or between 100 phr and 145 phr, or between 110 phr and 140 phr.

For example, the Kraft lignin nanoparticles are present in a content ranging between 10 phr and 30 phr, or between 15 phr and 25 phr.

For example, the Kraft lignin nanoparticles comprise sulphur moieties in an amount ranging between 0.5 wt. % to 1.5 wt. % based on the total weight of the Kraft lignin nanoparticles and as determined by elemental analysis. With preference, the Kraft lignin nanoparticles comprise thiol moieties in an amount ranging between 45 wt. % and 65 wt. % based on the total weight of the sulphur moieties comprised within the Kraft lignin nanoparticles and as determined by elemental analysis, preferably in an amount ranging between 50 wt. % and 60 wt. %.

For example, the silica particles are made or comprise amorphous silica or fumed silica or a mixture of amorphous silica and fumed silica. With preference, the silica particles are made or comprise amorphous silica.

For example, the silica has a specific surface area ranging between 40 $m^2/g$ and 600 $m^2/g$ as determined by BET experiments using nitrogen gas in accordance with ASTM D6556, preferably between 50 $m^2/g$ and 300 $m^2/g$, more preferably between 100 $m^2/g$ and 250 $m^2/g$, even more preferably between 150 $m^2/g$ and 200 $m^2/g$.

For example, the silica has a particle size distribution ranging between 200 μm and 300 μm in accordance with ISO 787-18, preferably between 220 μm and 280 μm. Such silica are in fact micropearls that break upon mixing into rubber.

As regards the rubber

For example, said rubber is a non-polar rubber.

For example, said rubber is or comprises one or more selected from styrene-butadiene rubber, neodymium polybutadiene rubber, polybutadiene rubber, cis-polybutadiene rubber, polyisoprene rubber, styrene-isoprene rubber, styrene-isoprene-butadiene rubber, ethylene propylene rubber, ethylene propylene diene monomer/butyl rubber, copolymer or blends of any of previously-mentioned rubbers. With preference, said rubber is or comprises styrene-butadiene rubber.

For example, said styrene-butadiene rubber has a styrene microstructure content within a range of 20 wt. % to 50 wt. % based on the total weight of the styrene-butadiene rubber, or within a range of 25 wt. % to 45 wt. %, or of 30 wt. % to 40 wt. %; and a vinyl microstructure content within a range of 10 wt. % to 50 wt. % based on the total weight of the styrene-butadiene rubber, or within a range of 15 wt. % to 45 wt. %, or of 20 wt. % to 40 wt. %

For example, the weight average molecular weight of said at least one rubber is ranging between 400,000 g/mol and 1,000,000 g/mol as determined by GPC according to ASTM D5296-11; or between 550,000 g/mol and 950,000 g/mol.

For example, the phr ratio between the reinforcement materials and the one or more process oils is ranging between 3.5:1 and 8:1, and wherein the weight average molecular weight of said at least rubber is ranging between 400,000 g/mol and 1,000,000 g/mol as determined by GPC according to ASTM D5296-11.

For example, said styrene-butadiene rubber has a glass transition temperature ranging between −50° C. and −85° C., or between −55° C. and −80° C.

For example, the rubber composition further comprises from 15 phr to 40 phr of at least one hydrocarbon resin, or from 20 phr to 35 phr.

For example, said hydrocarbon resin has a glass transition temperature ranging between 30° C. and 80° C., or between 60° C. and 75° C., or between 60° C. and 70° C.

For example, said hydrocarbon resin is terpene resin.

For example, said styrene-butadiene rubber has a glass transition temperature ranging between −50° C. and −85° C. and the rubber composition further comprises from 15 phr to 40 phr of at least one hydrocarbon resin, from 5 phr to 25 phr of said one or more process oils, and the sum of the amount of said at least one hydrocarbon resin and the amount of the one or more process oils is ranging between 35 phr and 50 phr.

For example, the rubber composition further comprises at least one polybutadiene rubber having a glass transition temperature which is ranging between −85° C. to −115° C. With preference, the content of said at least one polybutadiene rubber in said rubber composition is less than 20 phr, or less than 15 phr. For example, the content of said at least one polybutadiene rubber in said rubber composition is ranging between 5 phr and 20 phr, or between 10 phr and 15 phr.

As regards the rubber composition itself

For example, said rubber composition is sulphur cured.

For example, the rubber composition comprises Kraft lignin nanoparticles distributed in aggregates of size ranging between 100 nm and below 900 nm as determined by scanning electron microscopy analysis, preferably between 150 nm and 850 nm, more preferably between 200 nm and 800 nm, even more preferably between 250 nm and 750 nm.

For example, the elongation at break of said rubber composition according to ASTM D412-98a is ranging between 700% and 1000%, or between 750% and 1000%, or between 800% and 1000%, or between 805% and 1000%, or between 700% and 950%

For example, the shore A of said rubber composition as determined by ASTM D-2240 is ranging between 66 and 75, or between 67 and 75, or between 68 and 74.

For example, the reinforcing index from the modulus at 300% onto the modulus at 100% of said rubber composition is ranging between 2.5 and 4.5, or between 2.6 and 4.4, or between 2.7 and 4.3, or between 2.8 and 4.2.

For example, the storage modulus E' measured at 30° C. by dynamic mechanical analysis of said rubber composition is ranging between 12 MPa and 25 MPa, or between 13 MPa and 24 MPa, or between 14 MPa and 23 MPa.

For example, the storage modulus E' measured at 60° C. by dynamic mechanical analysis of said rubber composition is ranging between 9 MPa and 20 MPa, or between 10 MPa and 19 MPa, or between 11 MPa and 18 MPa.

For example, the tan δ measured at 0° C. by dynamic mechanical analysis of said rubber composition is ranging between above 0.40 and 0.55, or between 0.41 and 0.54, or between 0.42 and 0.53.

For example, the tan δ measured at 60° C. by dynamic mechanical analysis of said rubber composition is ranging between 0.09 and below 0.17, or between 0.10 and 0.16, or between 0.11 and 0.15.

For example, the tan δ measured at 0° C. by dynamic mechanical analysis of said rubber composition is ranging between above 0.40 and 0.55 and the tan δ measured at 60°

C. by dynamic mechanical analysis of said rubber composition is ranging between 0.09 and below 0.17.

For example, the Payne effect ΔE' as determined by dynamic mechanical analysis after two sweeps of said rubber composition is ranging between 4 MPa and below 15 MPa, or between 4.5 MPa and 14.5 MPa, or between 5 MPa and 14 MPa, or between 5.5 MPa and 13.5 MPa.

As regards the process for making a rubber composition

For example, step b) comprises a first mixing step; a second mixing step and a third mixing step; wherein:
the first mixing step comprises dispersing the Kraft lignin nanoparticles, from 65 wt. % to 75 wt. % of the total content of the silica particles and the optional one or more process oils into the rubber to obtain a first mixture;
the second mixing step comprises dispersing the remaining part of the total content of the silica particles and one or more compatibilizers into the first mixture to obtain a second mixture, and
the third mixing step comprises dispersing one or more cross-linker agents into the second mixture.

With preference, the first mixing step of step (b) further comprises dispersing into the rubber at least one selected of one or more performance modifier additives or of one or more activators.

With preference, the second mixing step of step (b) further comprises dispersing into the first mixture at least one selected of one or more antiozonants or of one or more performance modifier additives.

With preference, the third mixing step of step (b) further comprises dispersing into the second mixture at least one selected of one or more activators or of one or more rubber cure accelerators.

For example, step (c) presents a cure rate index CRI of at least 6.5 $min^{-1}$ as determined by moving die rheometer (MDR 2000—Alpha Technologies), according to ASTM D5289; or of at least 7.5 $min^{-1}$, or of at least 8.5 $min^{-1}$.

For example, step (c) presents a cure rate index CRI ranging between 6.5 min-1 and 13 min-1 as determined by moving die rheometer (MDR 2000—Alpha Technologies), according to ASTM D5289, or between 7.5 min-1 and 12 min-1, or between 8.5 min-1 and 11 min-1.

For example, the curing conditions of step (c) comprise a curing temperature ranging between 70° C. and 160° C., or between 75° C. and 155° C., or between 80° C. and 150° C.

For example, the Kraft lignin nanoparticles have an average diameter size ranging between 10 nm and below 30 nm as determined by scanning electron microscopy and step (c) presents a curing time $t_{90}$ ranging between 15 minutes and less than 23 minutes as determined by moving die rheometer (MDR 2000—Alpha Technologies), or between 16 minutes and 22 minutes, or between 17 minutes and 21 minutes, or between 18 minutes and 20 minutes.

For example, the Kraft lignin nanoparticles have an average diameter size ranging between 10 nm and below 30 nm as determined by scanning electron microscopy and step (c) presents a scorch time $t_{s2}$ which is ranging between 5 minutes and 9 minutes as determined by moving die rheometer (MDR 2000—Alpha Technologies), or between 6 minutes and 8 minutes.

For example, the Kraft lignin nanoparticles have an average diameter size ranging between 30 nm and 60 nm as determined by scanning electron microscopy and step (c) presents a curing time $t_{90}$ ranging between 10 minutes and less than 15 minutes as determined by moving die rheometer (MDR 2000—Alpha Technologies), or between 11 minutes and 14 minutes.

For example, the Kraft lignin nanoparticles have an average diameter size ranging between 30 nm and 60 nm as determined by scanning electron microscopy and step (c) presents a scorch time $t_{s2}$ which is ranging between 2 minutes and below 5 minutes as determined by moving die rheometer (MDR 2000—Alpha Technologies), or between 2.5 minutes and 4.5 minutes.

Definitions

The term "phr" as used herein, and according to conventional practice, refers to parts by weight of a respective material per 100 parts by weight of rubber, or elastomer. In general, using this convention a rubber composition is comprised of 100 parts of by weight of the rubber/elastomer.

A reference to a glass transition temperature, or Tg, of an elastomer or elastomer composition, where referred to herein, represents the glass transition temperature of the respective elastomer or elastomer composition in its uncured state. Tg is defined as the temperature at or above which the large segmental mobility of the polymer main chain starts. A Tg is determined as a peak midpoint by a differential scanning calorimeter (DSC) at a temperature rate of increase of 10° C. per minute, according to ASTM D3418.

BRIEF DESCRIPTION OF THE DRAWINGS

The invention will be described by way of example and with reference to the accompanying drawings in which.

DETAILED DESCRIPTION OF THE INVENTION

Figure 1:
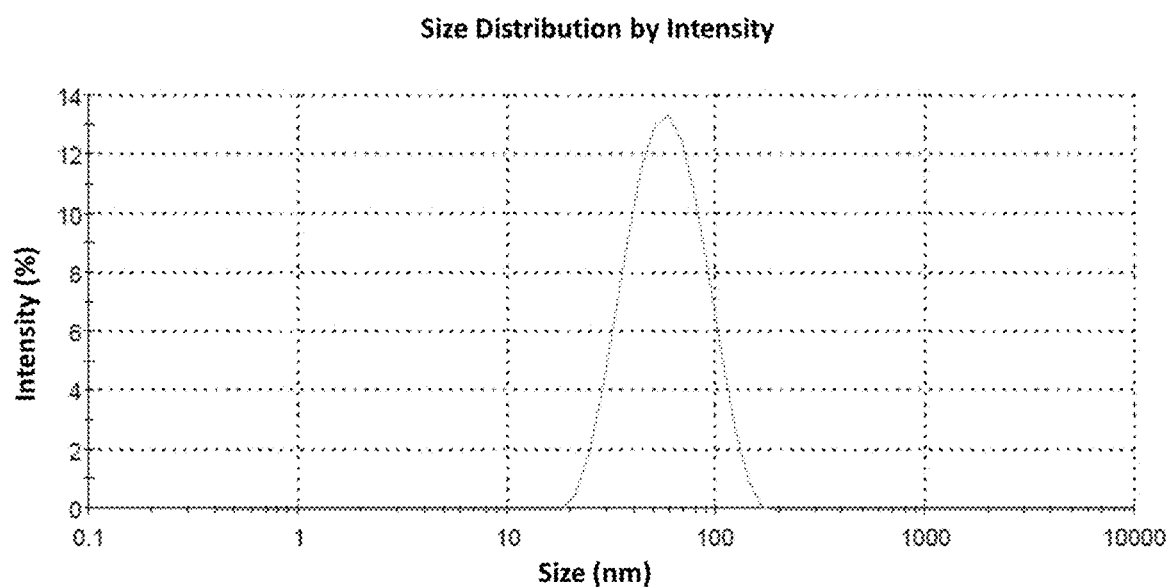
FIG. 1 is a DLS spectrum of KL nanoparticles fabricated using DMSO.

The present disclosure relates to a rubber composition comprising at least rubber and reinforcement materials, the reinforcement materials comprising silica particles and Kraft lignin nanoparticles, wherein the phr ratio between the silica particles and Kraft lignin nanoparticles is ranging between 3 and 20; wherein the Kraft lignin nanoparticles have an average diameter size ranging between 10 and 100 nm as determined by scanning electron microscopy; and wherein the Kraft lignin nanoparticles have a glass transition temperature of at least 150° C., or of at least 155° C., as determined by Differential Scanning Calorimetry.

The Kraft lignin nanoparticles can also have a specific surface area ranging between 70 m$^2$/g and 430 m$^2$/g as determined by BET experiments instead of or in addition to, the average diameter size ranging between 10 and 100 nm as determined by scanning electron microscopy.

Process Oils

The rubber composition can also comprise one or more process oils. Process oils, also called extender oils, are hydrocarbon mixtures boiling at the same temperature range as lubricant base oils. The process oils are generally derived from petroleum distillates by solvent extraction. They are added to the rubber to decrease the viscosity of the rubber and thereby facilitate mixing, extruding and general workability of the rubber compound (which also includes several additional components), to reduce mill and calander shrinkage, to aid the dispersion of fillers, to modify the physical properties of the vulcanized and/or finished rubber compounds.

For example, the one or more process oils are one or more oils selected from treated distillate aromatic extracts (TDAE), mild extracted solvate (MES) or treated residual aromatic extracts (TRAE). With preference, the process oils are or comprise treated distillate aromatic extracts (TDAE).

For example, the one or more process oils are present in a content ranging between 5 phr and 50 phr, or between 10 phr and 45 phr, or between 15 phr and 40 phr.

For example, the phr ratio between the reinforcement materials and the one or more process oils is ranging between 3.5:1 and 8:1, or 4:1 to 8:1, or 4:1 to 7:1, or 4:1 to 6:1, or 3.5:1 to 6:1.

To improve the properties of the rubber, reinforcement materials can be dispersed into the rubber. Properties such as tensile strength, tear-resistance and abrasion resistance of the rubber can thus be improved. The dispersion of silica in the polymer can strongly influence the final properties of the rubber compounds. To this end, particular Kraft lignin nanoparticles (KLNPs) have been developed for the purpose of replacing part of the silica or for adding such nanoparticles into the rubber composition as an additional filler.

Silica

With regards to the silica, it can be added to the rubber composition under the form of silica particles. For example, the silica particles are made or comprise amorphous silica or fumed silica or a mixture of amorphous silica and fumed silica. With preference, the silica particles are made of or comprise amorphous silica. Commonly employed siliceous pigments which may be used in the rubber compound include for instance conventional pyrogenic and precipitated siliceous pigments.

For example, the silica has a specific surface area ranging between 40 m$^2$/g and 600 m$^2$/g as determined by BET experiments using nitrogen gas in accordance with ASTM D6556, preferably between 50 m$^2$/g and 300 m$^2$/g, more preferably between 100 m$^2$/g and 250 m$^2$/g, even more preferably between 150 m$^2$/g and 200 m$^2$/g.

For example, the silica has a dibutylphthalate (DBP) absorption value in a range of 100 cm$^3$/100 g to 400 cm$^3$/100 g, preferably 150 cm$^3$/100 g to 300 cm$^3$/100 g, which can be determined according to ASTM D 2414.

For example, the silica has a particle size ranging between 10 nm and 100 nm as determined by scanning electron microscopy, or between 25 nm and 75 nm.

For example, the silica has a particle size distribution ranging between 200 μm and 300 μm in accordance with ISO 787-18, preferably between 220 μm and 280 μm. They are forming agglomerates that break upon mixing into the rubber solution.

For example, the rubber composition may comprise pre-silanized silica which may for instance have a CTAB adsorption surface area of between 130 m$^2$/g and 210 m$^2$/g, or between 130 m$^2$/g and 150 m$^2$/g, or between 190 m$^2$/g and 210 m$^2$/g, or between 195 m$^2$/g and 205 m$^2$/g. The CTAB (cetyl trimethyl ammonium bromide) method for the determination of the silica surface area (ASTM D6845) is known to the person skilled in the art. The pre-silanized silica may be hydrophobized before its addition to the rubber composition by treatment with at least one silane. Suitable silanes include but are not limited to alkylsilanes, alkoxysilanes, organoalkoxysilyl polysulfides and organomercaptoalkoxysilanes. It is also possible that the pre-silanized silica is pre-treated with a silica coupling agent comprised of, for example, an alkoxyorganomercaptoalkoxysilane or a combination of alkoxysilane and organomercaptoalkoxysilane before blending the pre-treated silica with the rubber instead of reacting the precipitated silica with the silica coupling agent in situ within the rubber.

For example, the content of silica particles in the rubber composition is ranging between 90 phr and 150 phr, or between 100 phr and 145 phr, or between 110 phr and 140 phr.

Kraft Lignin Nanoparticles

Kraft lignin nanoparticles are generated as follows. KL is provided in a first step (A). Then, in a second step (B), an organic solution of said KL is prepared by the dissolution of said KL in a single organic solvent. To form the nanoparticles, the solvent-shifting technique requires the addition of an anti-solvent, namely a solvent with no dissolving power of the KL, to trigger the self-assembly and/or the dispersion and thus the formation of colloidal particles. So, in a third step (C), the solution of step (B) is mixed with an antisolvent being or comprising water. In the present disclosure, the organic solution of KL is added to the antisolvent during the third step (C). The addition of the organic solution in water corresponds to the addition of the organic solution in a medium that quenches the growth of the nanoparticles. This drastic increase in the antisolvent reservoir is, therefore, one of the reasons why it is possible to generate nanoparticles of KL having a small size.

With preference, step (C) of mixing the KL solution into water is performed under an inert atmosphere, for instance under argon and/or nitrogen. This prevents the inclusion of air in the medium and subsequently the formation of foam.

The addition of the KL solution in the organic solvent during step (C) is performed dropwise or rapidly.

When the organic solution of KL is added to water, the formation of the KL nanoparticles is carried out instantaneously.

In a preferred implementation of the method of the present disclosure, steps (B) and (C) are performed in a single reactor, or, in other terms, the manufacture of the colloidal dispersion of KL nanoparticles is a one-pot method. A "one-pot method" stands for a method in which the operations related to the dissolution of KL into one or more organic solvents and to the mixing of the solution with an antisolvent being or comprising water are carried out in the same vessel.

By acting on one or more of the five different parameters, which are the solvents, the KL concentration, the amount of the antisolvent, the temperature and/or the stirring speed at which the mixing of step (c) is carried out, it is possible to control the size of the KL nanoparticles. There is a synergistic effect with regard to the size of the KL nanoparticles when those five parameters are under control.

The narrow values of the PDI (ranging between 0.05 and 0.20) for the KL nanoparticles with a size ranging between 15 nm and 200 nm are to be highlighted.

Additionally, the method of the present disclosure allows for obtaining homogenous KL nanoparticles which do not coalesce together, nor aggregate together. This allows obtaining KL nanoparticles with a well distinguishable morphology (notably by using SEM or HIM analysis). Also, such KL nanoparticles have a good distribution and a good dispersion, notably when used as reinforcing filler for polymer nanocomposites.

1$^{st}$ Parameter: Effect of the Solvent

The first parameter concerns the choice of the organic solvent in which KL lignin must be dissolved before being added to the antisolvent. The size of the nanoparticles and the nuclei formation is completely dependent on the diffusion between the antisolvent, i.e. the water, and the organic solvent. The faster is the diffusion, the smaller is the size of the nuclei. Miscibility of DMSO (log Kow: −1.35; $\delta_d$=18.4 MPa$^{0.5}$; $\delta_p$=16.4 MPa$^{0.5}$; $\delta_h$=10.2 MPa$^{0.5}$) with water is much greater than the THF (log Kow: 0.46; $\delta_d$=16.8 MPa$^{0.5}$; $\delta_p$=5.7 MPa$^{0.5}$; $\delta_h$=8.0 MPa$^{0.5}$). Therefore, the diffusion will be faster in the DMSO system than in the THF system. This leads to the formation of smaller nuclei in the DMSO system than in the THF system at the same initial lignin concentration. Assuming that the initial concentration is the same, the number of smaller nuclei in the DMSO system will be higher than the number of smaller nuclei in the THF system. This behavior predominantly affects the final size of KL nanoparticles.

Moreover, it is advantageous that the organic solvent is dried or anhydrous before it is used to dissolve KL.

2$^{nd}$ Parameter: Effect of the KL Concentration

The second parameter relates to the initial concentration of KL in the organic solution. To obtain KL nanoparticles with an average diameter size ranging between 10 nm and 200 nm, as determined by Scanning Electron Microscopy studies, or between 15 nm and 200 nm, and preferably ranging between 15 nm and 70 nm, or between 15 nm and 60 nm, the KL concentration in the organic solution can be ranging between 15 mg/mL and 55 mg/mL. Advantageously, the KL concentrations in the organic solution can be ranging between 17 mg/mL and 53 mg/mL, more preferentially between 20 mg/mL and 50 mg/mL.

Increasing the KL concentration results in increasing the KL nanoparticles size.

3$^{rd}$ Parameter: Effect of the Amount of Anti-Solvent (MilliQ Water)

The third parameter concerns the volume of the water in which the organic solution of KL is added. By increasing the amount of antisolvent (i.e. water), it appears that the KL nanoparticles will be more dispersed in the medium, which has for effect to decrease the number of the phenomenon of coalescence and/or Ostwald ripening. When the water reservoir increases, the nanoparticles have more space between each other, which means that their growth will be hindered. This effect can be observed in any organic solvents chosen for dissolving KL.

Thus, advantageously, the volume ratio between the antisolvent and the solution of step (b) is ranging between 0.3 and 2.5.

4$^{th}$ Parameter: Effect of the Temperature

The fourth parameter relates to the temperature at which the addition of the organic solution of KL onto the water is performed. This parameter is a function of the dissolving power of the organic solvent and the miscibility between the organic solvent and the antisolvent.

When a solvent with a poor dissolving power is used, increasing the temperature is a way to increase the phenomenon of coalescence and/or Ostwald ripening and thus the size of the KL nanoparticles is increasing. For instance, solvents with a poor dissolving power have a partition coefficient superior to −0.50, preferably superior to −0.40, more preferably superior to −0.30 and/or a dipole moment inferior to 3 D (<1.000692285*10-29 Cm). Advantageously, such solvents can be 1,4-dioxane, dichloromethane, THF, ethyl acetate and/or acetone, more However, when a solvent with a good dissolving power is used, the increase in temperature results in increasing the diffusion between the solvent and the water, which leads to more space between the KL nanoparticles in formation and therefore, helps to obtain KL nanoparticles with a low average diameter size since coalescence and/or Ostwald ripening are avoided. For instance, solvents with high dissolving power have a partition coefficient inferior to −0.50, preferably inferior to −0.60, more preferably inferior to −0.70 and/or are highly polar with a dipole moment superior to 3 D (>1.000692285*10$^{-29}$ Cm). Advantageously, such solvents can be DMSO and/or DMF, more preferably DMSO. In this case, the mixing temperature is preferably ranging between 1° C. and 80° C., more preferably between 10° C. and 70° C.

5th Parameter: Effect of the Stirring Speed

The fifth parameter is the stirring speed that is applied during the process of step (c) of mixing the solution of KL into the water. Increasing the stirring speed has for effect to reduce the size of the nanoparticles. With preference, the stirring speed can be ranging between 300 rpm and 2500 rpm, more preferentially between 400 rpm and 2000 rpm. However, at stirring speed above 2500 rpm, preferably above 3000 rpm, more preferably above 3500 rpm, the addition and/or mixing of the KL solution into the antisolvent must be performed under an inert atmosphere (for instance, under argon and/or nitrogen atmosphere) to prevent the formation of foam. Indeed, foaming is caused by the combining effect of the inherent amphiphilic nature of the KL, entrapped air and higher stirring speed. Foaming can be detrimental to the final yield of KL nanoparticles that are obtained.

Advantageously, the one or more organic solvents are removed after the formation of the KL nanoparticles. To completely yield dried KL nanoparticles, a time that is ranging between 3 and 10 days is needed to remove the solvents. Such time is relatively long because it is needed to remove the organic solvent and the antisolvent without de-structuring the KL nanoparticles.

Solvents presenting high boiling points, such as DMSO (b.p.=189° C.), DMF (b.p. 153° C.) or 1,4-dioxane (b.p. 101° C.), can be removed from the KL nanoparticles using a dialysis process.

Solvents presenting lower boiling points, such as acetonitrile (b.p=82° C.), dichloromethane (b.p.=40° C.), tetrahydrofuran (b.p.=66° C.), ethyl acetate (b.p.=77° C.) or acetone (b.p.=56° C.) can be removed from the KL nanoparticles using a rotary evaporator.

After complete removal of the solvents, a freeze-drying step can be undertaken to remove the antisolvents, i.e. water, from the KL nanoparticles. Preferentially, the freeze-drying step can be carried out at a temperature ranging between −50° C. and −100° C., more preferentially between −60° C. and −90° C., even more preferentially at −80° C. and/or during a time of at least 24 hours, preferentially of at least 3 days. The step of freeze-drying can also be advantageously carried out at a pressure ranging between 0.05 Pa and 0.20 Pa, more preferentially at a pressure ranging between 0.07 Pa and 0.15 Pa, and even more preferentially at 0.12 Pa.

Characterization of the KL Nanoparticles Used in the Present Disclosure

For example, the average diameter size of the nanoparticles is ranging from 9 nm to 200 nm, or from 9 nm to 70 nm, or from 10 nm to 70 nm, or from 15 nm to 70 nm, or from 15 nm to 60 nm, as determined by imaging techniques, such as Scanning Electron Microscopy and/or Helium Ion Microscopy. SEM can be used for the nanoparticles presenting a bigger average diameter size while HIM is used for the nanoparticles presenting a smaller average diameter size. In general, a size of above 15 nm can be well-detected by SEM. As the KL nanoparticles generated by DMSO have in general a smaller average diameter size than the KL nanoparticles generated with THF, HIM experiments are carried out on the KL nanoparticles generated with DMSO. However, for KL nanoparticles, HIM experiments provide more precise results in the determination of the size.

For example, the Kraft lignin nanoparticles have an average diameter size ranging from 9 nm up to 14 nm as determined by Helium Ion Microscopy; or from 10 nm up to 13 nm.

For example, the Kraft lignin nanoparticles have an average diameter size ranging from 15 nm up to 200 nm as determined by Scanning Electron Microscopy; or from 15 nm up to 150 nm; or from 15 nm up to 100 nm; or from 15 nm up to 70 nm; or from 15 nm up to 65 nm; or from 15 nm up to 60 nm; or from 15 nm up to 55 nm; or from 15 nm up to 50 nm; or from 15 nm up to 45 nm; or from 15 nm up to 40 nm; or from 15 nm up to 35 nm.

For example, the average diameter size, as determined by Scanning Electron Microscopy, is at least 15 nm, and at most 200 nm, preferably at most 150 nm, more preferably at most 100 nm, even more preferably at most 65 nm, most preferably at most 60 nm, even most preferably at most 50 nm.

For example, the average diameter size, as determined by Scanning Electron Microscopy is at least 20 nm, and at most 200 nm, preferably at most 150 nm, more preferably at most 100 nm, even more preferably at most 65 nm, most preferably at most 60 nm, even most preferably at most 50 nm.

For example, the average diameter size, as determined by Scanning Electron Microscopy is at least 25 nm, and at most 200 nm, preferably at most 150 nm, more preferably at most 100 nm, even more preferably at most 65 nm, most preferably at most 60 nm, even most preferably at most 50 nm.

When a solvent with high dissolving power (e.g., DMSO) is used to dissolve KL, the average diameter size of the KL nanoparticles obtained with the process according to the disclosure is ranging between 9 nm and 45 nm, or between 15 nm and 45 nm, preferably between 20 nm and 40 nm.

When a solvent with poor dissolving power (e.g., THF) is used to dissolve KL, the average diameter size of the KL nanoparticles obtained with the process according to the disclosure is ranging between 40 nm and 90 nm, preferably between 50 nm and 80 nm, or between 40 nm and 70 nm.

The KL nanoparticles can be re-dispersible in water.

With preference, the nanoparticle having an average diameter size ranging from 15 nm up to 60 nm has a transmittance taken at a wavelength of 600 nm ranging between 40% and 80% as determined by absorption analysis, preferably between 45% and 75%.

The KL nanoparticles have a fluffy aspect. For collecting them, it is preferable to use an electrostatic-free sample collector, because of the formation of high static charges on the nanoparticles.

The three-dimensional structure of the KL nanoparticle comprises at least two types of π-π stacking, as determined by UV-Visible analysis. There are three types of π-π stacking in organic compounds comprising aromatic structures, namely the H-shape corresponding to a sandwich-like structure, the T-shaped structure and the J-shaped structure corresponding to a parallel-displaced structure.

The KL nanoparticles have a glass transition temperature ($T_g$) of at least 150° C. as determined by Differential Scanning Calorimetry. With preference, the KL nanoparticles have an additional $T_g$ that is ranging between 110° C. and 130° C.

For example, said Kraft lignin nanoparticles have a transmittance taken at a wavelength of 600 nm ranging between 40% and 80% as determined by absorption analysis, preferably between 45% and 75%.

For example, the Kraft lignin nanoparticles have a Young's modulus ranging between 1.0 GPa and below 3.0 GPa as determined by Atomic Force Microscopy, preferentially between 1.4 GPa and 2.9 GPa, more preferentially between 1.5 GPa and 2.8 GPa, even more preferentially between 1.6 GPa and 2.7 GPa. Alternatively, the Kraft lignin nanoparticles have a Young's modulus ranging between 3.0 GPa and 6.0 GPa, preferentially between 3.2 GPa and 5.1 GPa, more preferentially between 3.4 GPa and 4.9 GPa, even more preferentially between 3.6 GPa and 4.7 GPa.

For example, said Kraft lignin nanoparticles have a polydispersity index ranging between 0.05 and 0.20 as determined by Dynamic Light Scattering method, preferably between 0.07 and 0.18, more preferably between 0.09 and 0.16, even more preferably between 0.11 and 0.14.

For example, the phr ratio between the silica particles and Kraft lignin nanoparticles is ranging between 5 and 20.

For example, the Kraft lignin nanoparticles comprise sulphur moieties in an amount ranging between 0.5 wt. % to 1.5 wt. % based on the total weight of the Kraft lignin nanoparticles and as determined by elemental analysis. With preference, the Kraft lignin nanoparticles comprises thiol moieties in an amount ranging between 45 wt. % and 65 wt. % based on the total weight of the sulphur moieties comprised within the Kraft lignin nanoparticles and as determined by XPS, preferably in an amount ranging between 50 wt. % and 60 wt. %.

For example, the Kraft lignin nanoparticles that are detailed above are present in the rubber composition at a content ranging between 10 phr and 30 phr, or between 15 phr and 25 phr.

Rubber

For example, said rubber is a non-polar rubber.

For example, said rubber is or comprises one or more selected from styrene-butadiene rubber, neodymium polybutadiene rubber, polybutadiene rubber, cis-polybutadiene rubber, polyisoprene rubber, styrene-isoprene rubber, styrene-isoprene-butadiene rubber, ethylene propylene rubber, ethylene propylene diene monomer/butyl rubber, copolymer or blends of any of previously-mentioned rubbers. With preference, said rubber is or comprises styrene-butadiene rubber.

For example, said styrene-butadiene rubber has a styrene microstructure content within a range of 20 wt. % to 50 wt. % based on the total weight of the styrene-butadiene rubber, or within a range of 25 wt. % to 45 wt. %, or of 30 wt. % to 40 wt. %; and a vinyl microstructure content within a range of 10 wt. % to 50 wt. % based on the total weight of the styrene-butadiene rubber, or within a range of 15 wt. % to 45 wt. %, or of 20 wt. % to 40 wt. %

For example, the weight average molecular weight of said at least one rubber is ranging between 400,000 g/mol and 1,000,000 g/mol determined by GPC according to ASTM D5296-11; or between 550,000 g/mol and 950,000 g/mol.

For example, the phr ratio between the reinforcement materials and the one or more process oils when present is ranging between 3.5:1 and 8:1, and wherein the weight average molecular weight of said at least rubber is ranging between 400,000 g/mol and 1,000,000 g/mol determined by GPC according to ASTM D5296-11. The high filler to oil ratio with said restricted average molecular weight helps to provide a good rolling resistance of the rubber composition.

For example, said styrene-butadiene rubber has a glass transition temperature ranging between −50° C. and −85° C., or between −55° C. and −80° C.

For example, the rubber composition further comprises from 15 phr to 40 phr of at least one hydrocarbon resin, or from 20 phr to 35 phr. Examples of said at least one hydrocarbon resins can be coumarone-indene-resins, petroleum resins, terpene resins, a-methyl styrene resins and mixtures thereof; preferably terpene resins such as a-pinene based resin. The terpene resins may for example have a molecular weight Mw of less than 1000 g/mol, preferably less than 950 g/mol or ranging between 200 g/mol and 950 g/mol, as measured by GPC. Said hydrocarbon resin has advantageously a glass transition temperature ranging between 30° C. and 80° C., or between 60° C. and 75° C., or between 60° C. and 70° C. Such a relatively high resin Tg is considered to be beneficial for wet grip, with limited impact on rolling resistance.

For example, said styrene-butadiene rubber has a glass transition temperature ranging between −50° C. and −85° C. and the rubber composition further comprises from 15 phr to 40 phr of at least one hydrocarbon resin, from 5 phr to 25 phr of said one or more process oils, and the sum of the amount of said at least one hydrocarbon resin and the amount of the one or more process oils is ranging between 35 phr and 50 phr. Such kind of rubber composition comprising this specific styrene-butadiene rubber can provide an advanced balance between rolling resistance/snow performance and wet performance/treadwear.

For example, the rubber composition further comprises at least one polybutadiene rubber having a glass transition temperature which is ranging between −85° C. to −115° C. With preference, the content of said at least one polybutadiene rubber in said rubber composition is less than 20 phr, or less than 15 phr. For example, the content of said at least one polybutadiene rubber in said rubber composition is ranging between 5 phr and 20 phr, or between 10 phr and 15 phr.

Process for Making the Rubber Composition of the Present Disclosure

Said process comprises the steps of (a) providing at least rubber and one or more reinforcement materials, (b) mixing the rubber with the one or more reinforcement materials to obtain a mixture; and (c) curing said mixture under curing conditions; wherein said reinforcement materials comprise silica particles and Kraft lignin nanoparticles in a phr ratio between the silica particles and Kraft lignin nanoparticles ranging between 3 and 20, or between 5 and 20, wherein the Kraft lignin nanoparticles have a glass transition temperature of at least 150° C. as determined by Differential Scanning Calorimetry and wherein the Kraft lignin nanoparticles have an average diameter size ranging between 10 and 100 nm as determined by scanning electron microscopy; and/or wherein the Kraft lignin nanoparticles have a specific surface area ranging between 70 $m^2/g$ and 430 $m^2/g$ as determined by BET experiments.

Optionally, one or more process oils can be added to the mixture in order to improve the making of the rubber composition.

In order to increase the dispersion of the component within the rubber, step (b) can comprise a first mixing step; a second mixing step and a third mixing step; wherein:
  the first mixing step comprises dispersing the Kraft lignin nanoparticles, from 65 wt. % to 75 wt. %, or from 67 wt. % to 73 wt. % of the total content of the silica particles and the optional one or more process oils into the rubber to obtain a first mixture;
  the second mixing step comprises dispersing the remaining part of the total content of the silica particles and one or more compatibilizers into the first mixture to obtain a second mixture, and
  the third mixing step comprises dispersing one or more cross-linker agents into the second mixture.

The first mixing step, second mixing step and third mixing step, respectively correspond to non-productive stage 1, non-productive stage 2 and productive mixing stage 3.

With preference, the first mixing step of step (b) further comprises dispersing into the rubber at least one selected of one or more performance modifier additives or of one or more activators.

For example, one performance modifier additive can be RO PR383.

For example, activators can be zinc oxide and/or stearic acid, as well as other fatty acids, such as lauric acid, palmitic acid, oleic acid, and/or naphthenic acid. With preference, zinc oxide and/or stearic acid are used as activators.

With preference, the second mixing step of step (b) further comprises dispersing into the first mixture at least one selected of one or more antiozonants/antioxidants or of one or more performance modifier additives.

For example, an antiozonant/antioxidant can be 6PPD, i.e., N-(1,3-dimethylbutyl)-N'-phenyl-p-phenylenediamine, or 2,2,4-trimethyl-1,2-dihydroquinoline, or any alkylated diphenylamines, or any compounds referenced as antidegradants according to ASTM D4676, or any mixture thereof. With preference, the antiozonant/antioxidant is 6PPD.

With preference, the third mixing step of step (b) further comprises dispersing into the second mixture at least one selected of one or more vulcanization agents or of one or more rubber cure accelerators.

For example, one or more vulcanization agents can be sulphur (e.g. rhombic sulphur), tetramethylthiuram disulfide, N-oxydiethylene-N'-oxydiethylenethiocarbamylsulfonamide, dipentamethylenethiuramtetrasulfide, 2-morpholinodithiobenzothiazole, and/or alkyl phenol disulfide. Thus, said rubber composition is sulphur cured.

For example, one rubber cure accelerator can be diphenyl guanidine, N-cyclohexyl-2-benzothiazole sulfenamide, dithiocarbamate/xanthates, or any mixture thereof.

For example, step (c) presents a cure rate index CRI of at least 6.5 $min^{-1}$; or of at least 7.5 $min^{-1}$, or of at least 8.5 $min^{-1}$.

For example, step (c) presents a cure rate index CRI ranging between 6.5 $min^{-1}$ and 13 $min^{-1}$, or between 7.5 $min^{-1}$ and 12 $min^{-1}$, or between 8.5 $min^{-1}$ and 11 $min^{-1}$.

For example, the curing conditions of step (c) comprise a curing temperature ranging between 70° C. and 160° C., or between 75° C. and 155° C., or between 80° C. and 150° C.

For example, the first mixing step, the second mixing step and the third mixing step are performed under a screw speed ranging from 30 rpm to 150 rpm, or from 50 rpm to 130 rpm, or from 70 rpm to 110 rpm.

It is advantageous that the process is carried out in a mixer. Such mixer has preferably a ram, since this improves the rubber compounding quality. For example, during the first mixing step, the ram is raised during a time ranging between 5 minutes and 9 minutes and then the ram is dropped during a time ranging between 6 minutes and 11 minutes. For example, during the second mixing step, the ram is raised during a time ranging between 2 minutes and 5 minutes and then the ram is dropped during a time ranging between 5 minutes and 9 minutes. For example, during the third mixing step, the ram is dropped during a time ranging between 1 minute and 5 minutes.

For example, the Kraft lignin nanoparticles have an average diameter size ranging between 10 nm and below 30 nm as determined by scanning electron microscopy and step (c) presents a curing time $t_{90}$ ranging between 15 minutes and less than 23 minutes, or between 16 minutes and 22 minutes, or between 17 minutes and 21 minutes, or between 18 minutes and 20 minutes.

For example, the Kraft lignin nanoparticles have an average diameter size ranging between 10 nm and below 30 nm as determined by scanning electron microscopy and step (c) presents a scorch time $t_{s2}$ ranging between 5 minutes and 9 minutes, or between 6 minutes and 8 minutes.

For example, the Kraft lignin nanoparticles have an average diameter size ranging between 30 nm and 60 nm as determined by scanning electron microscopy and step (c) presents a curing time $t_{90}$ ranging between 10 minutes and less than 15 minutes, or between 11 minutes and 14 minutes. A small curing time $t_{90}$ is an indication of high productivity, since less energy is needed for curing.

For example, the Kraft lignin nanoparticles have an average diameter size ranging between 30 nm and 60 nm as determined by scanning electron microscopy and step (c) presents a scorch time $t_{s2}$ ranging between 2 minutes and below 5 minutes, or between 2.5 minutes and 4.5 minutes.

Advantageously, the rubber composition that has been made from this process comprises Kraft lignin nanoparticles distributed in aggregates of size ranging between 100 nm and below 900 nm as determined by scanning electron microscopy analysis, preferably between 150 nm and 850 nm, more preferably between 200 nm and 800 nm, even more preferably between 250 nm and 750 nm. This is remarkable since it is largely known that it is not obvious to disperse KLNPs in non-polar rubber.

Properties of the Rubber Composition of the Present Disclosure

For example, the elongation at break of said rubber composition according to ASTM D412-98a is ranging between 700% and 1000%, or between 750% and 1000%, or between 800% and 1000%, or between 805% and 1000%, or between 700% and 950

For example, the shore A hardness of said rubber composition as determined by ASTM D-2240 is ranging between 66 and 75, or between 67 and 75, or between 68 and 74.

For example, the reinforcing index from the modulus at 300% onto the modulus at 100% of said rubber composition is ranging between 2.5 and 4.5, or between 2.6 and 4.4, or between 2.7 and 4.3, or between 2.8 and 4.2.

For example, the storage modulus E' measured at 30° C. by dynamic mechanical analysis of said rubber composition is ranging between 12 MPa and 25 MPa, or between 13 MPa and 24 MPa, or between 14 MPa and 23 MPa.

For example, the storage modulus E' measured at 60° C. by dynamic mechanical analysis of said rubber composition is ranging between 9 MPa and 20 MPa, or between 10 MPa and 19 MPa, or between 11 MPa and 18 MPa.

For example, the tan δ measured at 0° C. by dynamic mechanical analysis of said rubber composition is ranging between above 0.40 and 0.55, or between 0.41 and 0.54, or between 0.42 and 0.53.

For example, the tan δ measured at 60° C. by dynamic mechanical analysis of said rubber composition is ranging between 0.09 and below 0.17, or between 0.10 and 0.16, or between 0.11 and 0.15.

For example, the tan δ measured at 0° C. by dynamic mechanical analysis of said rubber composition is ranging between above 0.40 and 0.55 and the tan δ measured at 60° C. by dynamic mechanical analysis of said rubber composition is ranging between 0.09 and below 0.17.

For example, the Payne effect ΔE' as determined by dynamic mechanical analysis after two sweeps of said rubber composition is ranging between 4 MPa and below 15 MPa, or between 4.5 MPa and 14.5 MPa, or between 5 MPa and 14 MPa, or between 5.5 MPa and 13.5 MPa.

Properties of the Rubber Composition in which the KLNPs have an Average Diameter Size Ranging Between 10 nm and Below 30 nm of the Present Disclosure For example, the tensile strength of said rubber composition according to ASTM D412-98a is ranging between 14 MPa and 17 MPa, or between 15 MPa and 16 MPa.

For example, the elongation at break of said rubber composition according to ASTM D412-98a is ranging between 750 MPa and 900 MPa, or between 770 MPa and 880 MPa, or between 790 MPa and 860 MPa.

For example, the reinforcing index from the modulus at 300% onto the modulus at 100% of said rubber composition is ranging between 3.8 and 4.5, or between 3.9 and 4.4, or between 4.0 and 4.3.

For example, the Payne effect $\Delta E'$ as determined by dynamic mechanical analysis after two sweeps of said rubber composition is ranging between 4 MPa and below 7 MPa, or between 4.5 MPA and 6.5 MPa.

For example, the shore A as determined by ASTM D-2240 of said rubber composition is ranging between above 66 and 71, or between 67 and 70.

For example, the crosslink density as determined by the Flory-Rehner equation of said rubber composition is ranging between $48 \times 10^{-3}$ mol/g and $50 \times 10^{-3}$ mol/g, or between $48.5 \times 10^{-3}$ mol/g and $49.5 \times 10^{-3}$ mol/g.

Properties of the Rubber Composition in which the KLNPs Have an Average Diameter Size Ranging Between 30 nm and 60 nm of the Present Disclosure For example, the tensile strength of said rubber composition according to ASTM D412-98a is ranging between 13 MPa and 20 MPa, or between 14 MPa and 19 MPa.

For example, the elongation at break of said rubber composition according to ASTM D412-98a is ranging between 700 MPa and 1000 MPa, or between 750 MPa and 950 MPa, or between 800 MPa and 900 MPa.

For example, the reinforcing index from the modulus at 300% onto the modulus at 100% of said rubber composition is ranging between 2.5 and 3.2, or between 2.6 and 3.1, or between 2.7 and 3.0.

For example, the Payne effect $\Delta E'$ as determined by dynamic mechanical analysis after two sweeps of said rubber composition is ranging between 7 MPa and below 15 MPa, or between 8 MPa and 14 MPa, or between 9 MPa and 13 MPa.

For example, the shore A as determined by ASTM D-2240 of said rubber composition is ranging between above 65 and 75, or between 66 and 74, or between 67 and 73.

For example, the crosslink density as determined by the Flory-Rehner equation of said rubber composition is ranging between $46.5 \times 10^{-3}$ mol/g and $50 \times 10^{-3}$ mol/g, or between $47 \times 10^{-3}$ mol/g and $49.5 \times 10^{-3}$ mol/g, or between $47.5 \times 10^{-3}$ mol/g and $49 \times 10^{-3}$ mol/g.

Test and Determination Methods

Scanning Electron Microscopy (SEM)

SEM images were obtained using Focus Ion Beam (FIB) scanning electronic microscope (model: Helios Nanolab 650), operating at a voltage of 2-30 Kv and current of 13 to 100 pA. Before the SEM analysis, the samples were dried overnight in the open air. Measurements were done in both field free mode and immersion mode. To confirm the exact size of nanoparticles, SEM analyses are done without any metal coating. SEM images were analysed using ImageJ software.

Helium Ion Microscopy (HIM)

HIM images were obtained using Helium Ion Microscope (HIM: ZEISS ORION NanoFab) from Carl Zeiss Microscopy GmbH. All the lignin dispersions in DMSO were diluted 100× to visualize a primary particle effectively. The samples were prepared by drop-casting 0.02 mL of lignin dilution onto a silicon wafer and allowing it to dry overnight under a fume hood. The samples were characterized without any conductive coatings. The size and polydispersity of Lignin nanoparticles were analysed using ImageJ (Version 1.52) and MountainsSPIP 8 software.

HIM provides a better resolution on organic matters as the charging effect is less pronounced. From these two imaging techniques, the shape and the size of the nanoparticles were determined.

Differential Scanning Calorimetry (DSC)

Glass transition temperature ($T_g$) of the lignin samples was determined using a DSC instrument (DSC 3+, Mettler Toledo GmbH) under a nitrogen atmosphere. Before analysis, lignin was dried overnight under a vacuum at 60° C. During each measurement, approximately 10 mg of dry lignin was used. The samples were heated from room temperature to 120° C. at a heating rate of 10° C./min (first measurement cycle), isothermal for 5 minutes, cooled to 0° C. at a cooling rate of 10° C./min, isothermal for 5 minutes, then reheated to 200° C. at a heating rate of 10° C./min (second measurement cycle). $T_g$ was measured from the second measurement cycle.

Thermal Stability

The thermal stability of the cured rubber compound was determined using a thermogravimetry Analysis (TGA 2, Mettler Toledo GmbH). 10 mg of sample was placed in a 70 ml Alumina pan and heated from 25° C. to 800° C. at a heating rate of 10° C./min under a $N_2$ atmosphere ($N_2$ flow rate=50 mL/min).

Ultra-Violet (UV)-Visible Spectroscopy

π-π stacking of lignin nanoparticles was confirmed with the help of UV-Visible spectroscopy. The multifunctional monochromator-based microplate reader, Tecan infinite M1000Pro, has been used to determine the UV-Visible spectrum. To perform the analysis, dried KL nanoparticles were re-dispersed in MilliQ water (0.025 mg/mL). Samples were placed in the Greiner 96 Flat Bottom Transparent Polystyrol plate. Absorbances were measured from 230 nm to 800 nm wavelengths. 286 scans and 25 flashes were used at 25° C. for each measurement.

Absorption Analysis

PerkinElmer (LAMBDA 1050+UV/Vis/NIR) spectrophotometers were used to measure the % transmittance of Lignin Nanodispersion. 3 mL of 20 mg/mL (initial lignin concentration) of each nanodispersion and the deionized water were placed in an acrylic cuvette before the measurement. Double beam arrangements were used to perform the measurement. The percentage of transmittances was noted at 600 nm of wavelength.

Dynamic Light Scattering (DLS)

Hydrodynamic particle size and distribution (by determining the polydispersity index PDI) of the KL nanoparticles were measured using a Malvern Zetasizer Nano-ZS90 instrument (UK). Before analysis, samples were diluted 100 times in water. The refractive index of polystyrene (1.58654 at 632.8 nm) was used as an internal standard value. Measurements were done with a glass cuvette at 25° C. To confirm the reproducibility, three measurements were carried out in each sample. After each analysis, the glass cuvette was washed with MillliQ water and dried using argon. As a hydration layer is formed around the sample during the measurements of the size, the size obtained by DLS is bigger than the size obtained by using the scanning electron microscope/helium ion microscopy.

Atomic Force Microscope (AFM)

The topography and nanomechanical properties of the samples were thus investigated using an MFP3D Infinity AFM (Asylum Research/Oxford Instruments, Santa Barbara, CA) working in a bimodal AM-FM (Amplitude Modulation-Frequency Modulation) configuration. The samples were prepared by drop-casting the raw lignin, KLNP1 (DMSO system), and KLNP2 (THF system) (100× diluted and dispersed in water) on a silicon wafer and drying it overnight under a fume hood.

In the bimodal AM-FM mode, the nanoscale tip attached to the cantilever is simultaneously excited with two eigenmodes (two different oscillation motions of the cantilever). As the tip approaches the sample surface, the oscillation of the tip is reduced by its interaction. A feedback loop acting on the piezo scanner (Z direction) keeps the amplitude ($A_{1, set}$ (112 nm) of the $1^{st}$ eigenmode (c. 265 KHz) of the cantilever constant to obtain the topography of the sample. The amplitude $A_{1,free}$ away from the surface, was set at 160 nm. The $2^{nd}$ eigenmode (1.52 MHz) was simultaneously driven at a smaller amplitude $A_2$ (500 pm) and assisted in detecting the frequency shift ($\Delta f_2$) via a 90° phase lock loop ($\varphi_1$, PLL). The frequency feedback loop maintains the $2^{nd}$ eigenmode on resonance by a frequency shift ($\Delta f_2$) and this is caused due to the change in nanoparticle stiffness. Before calibration, the tip was scanned in contact mode over a $TiO_2$ surface to round up its apex. The increased tip curvature radius ensured a more stable operation in Elastic Modulus (EM) characterization.

$^{31}P$ Nuclear Magnetic Resonance (NMR) Spectroscopy Analysis

The ethanol soluble fraction of the lignin was extracted as follows. 1 g of lignin was dissolved in 1 L of ethanol using an ultrasonic bath for 20 min. The solutions were left to rest for 12 h for the insoluble part of lignin to sediment. The supernatants of the lignin solutions were collected and evaporated by rotavapor. The dried ethanol soluble fraction of the lignin was then extracted from the balloon using water. After filtration of filter paper, the ethanol soluble fraction of the lignin was dried in an oven at 50° C. overnight. The resulting powder was characterized by NMR.

The $^{31}P$ nuclear magnetic resonance (NMR) spectroscopy analysis was performed using an AVANCE III HD spectrometer (Bruker, Fällanden, Switzerland) equipped with a 5 mm BBO-probe, operating at a proton frequency of 600 MHz. The protocol was adapted following the work reported by A. Adjaoud et al.[2]. 30 mg of lignin were dissolved in 700 μL of a solvent mixture containing deuterated chloroform ($CDCl_3$) and anhydrous pyridine in a 1/1.6 (v/v) ratio. This solvent mixture served also for the preparation of the relaxation agent (RA) chromium (III) acetylacetonate (14 μmol $mL^{-1}$) and the internal standard (IS) endo-N-hydroxy-5-norbornene-2,3-dicarboximide (108 μmol $mL^{-1}$) solutions. The derivatization reaction performed prior to the $^{31}P$ NMR analysis, namely the phosphitylation, was performed by adding to the mixture of lignin 100 μL of the RA stock solution, 100 μL of the IS stock solution, and 100 μL of the phosphitylation reagent 2-chloro4,4,5,5-tetramethyl-1,3,2-dioxaphospholane (TMDP). All $^{31}P$ NMR spectra were calibrated on the IS derivatized peak (sharp signal at δ=152.0 ppm).

Gel Permeation Chromatography (GPC)

Gel permeation chromatography (GPC) analyses were performed on a 1200 Infinity gel permeation chromatograph (GPC, Agilent Technologies) equipped with an integrated IR detector, a PL PolarGel-M column and a PL PolarGel-M guard column (Agilent Technologies). Lignin samples were dissolved at a mass concentration of 3 mg·$mL^{-1}$ in a 0.1 M solution of $Li(CF_3SO_2)_2N$ in dimethyl formamide (DMF). The resulting lignin solution was filtered on PTFE 0.2 mm filters. 200 μL of filtered solution were injected into the PolarGel-M column (7.5*300 mm). The eluent was a 0.1 M solution of $Li(CF_3SO_2)_2N$ in DMF at a flow rate of 1 mL·$min^{-1}$. The column was maintained at 50° C. during the analysis. Polymethylmethacrylate standards (EasiVial PMMA, Agilent Technologies, Mp=550-1568000 g $mol^{-1}$) were used to perform calibration. The number average molecular weight ($M_n$) and the weight average molecular weight ($M_w$) were obtained using the resulting calibration curve. The polydispersity index (PDI) was calculated using the ratio $M_w/M_n$.

Cure Kinetics and Curing Process 55 g of rubber compounds were cured using a compression molding machine (hot Press: Labtech Engineering), (Temperature: 150° C., Pressure: 150 bar and Time: ($t_{90}$) from MDR. The cured rubber sheets have (150*150*2 mm).

According to ASTM D5289, 6 grams of each green compound were analysed to record the cure characteristics using a moving die rheometer (MDR 2000—Alpha Technologies) at 150° C. for 60 minutes. The cure characteristics such as the scorch time (ts2), optimum cure time (t90), minimum torque (ML) and maximum torque (MH) were thus observed.

Static Mechanical Properties

According to ASTM D412-98a, the tensile testing was measured using a universal testing machine (Instron 5967) at 25° C. The dumbbell-shaped samples were prepared using ISO 37-4 die. Pneumatic clamps with an extension rate of 200 mm/min were used to pull apart the samples. Five samples of each compound were tested, and their mean values were reported with standard deviation.

Crosslink Density 0.1 g of cured rubber samples were extracted with acetone for 72 h at room temperature to remove any organic substances. After drying at 60° C., 0.05 g of extracted samples were swollen in 50 mL of toluene for five days at room temperature. The weight of the swollen sample was measured immediately after taking it out from toluene (wipe the surfaces of the samples). Then the samples were weighed after being de-swollen for five days at 70° C. The crosslink density was calculated using the Flory-Rehner equation, as explained in the studies of Flory P. J. et al., entitled "*Statistical Mechanics of Cross-Linked Polymer Networks*" (*J. of Chem. Physics*, 1943, 11, 521-526) and Lee J-Y. et al., entitled "*Influence of the silanes on the crosslink density and crosslink structure of silica-filled solution styrene butadiene rubber compounds*" (*Composites Interfaces*, 2017, 24, 711-727).

Payne Effect

The dynamic strain sweep of the cured rubber samples (cuboids: 49*6.2*2 mm) was conducted using a dynamic mechanical analyzer (DMA, Netzsch 242 C, Germany) in tensile mode at 25° C. 10% static load of 15 N and (0 to 8%) dynamic load of 10 N with an increment of 10 steps/dec was applied to the samples with a frequency of 0.5 Hz. Two strain sweeps were conducted on each sample with 30 minutes intervals. The storage modulus (E') as a function of strain was obtained and analysed to understand the Payne effect.

EXAMPLES

The embodiments of the present disclosure will be better understood by looking at the example below.

UPM Finland supplied Kraft Lignin (BIOPIVA 190) as a brown powder. The following elements were determined by Inductively coupled plasma mass spectrometry (ICP-MS, using the standard NF EN ISO 21663) for this Kraft lignin:

(C 62.5, H 6.08, S 1.96, N<0.1) % with 95% of dry matter. Additional characterization of the Kraft Lignin has been performed by $^{31}$P nuclear magnetic resonance (NMR) spectroscopy analysis and by gel permeation chromatography (GPC) analyses. The results of Kraft lignin $^{31}$P NMR characterization gave a total content of hydroxyl groups of 8 mmol·g$^{-1}$. It gives 5.0 mmol·g$^{-1}$ for phenolic groups, 1.8 mmol·g$^{-1}$ for aliphatic groups and 1.0 mmol·g$^{-1}$ for carboxylic acid groups. It gives an aliphatic group/phenolic group ratio of 0.32. The results of lignin GPC characterization provide $M_n$ and $M_w$ values of Kraft lignin of respectively 460 and 1368 g·mol$^{-1}$, as well as a PDI of 2.9.

HPLC grade tetrahydrofuran (THF) and anhydrous dimethyl sulfoxide (DMSO) were purchased from Sigma Aldrich.

MilliQ water (0.2 μm PES high flux capsule filter; 18.2 M'Ω·cm at 23° C.) was used as it is from the laboratory.

Synthesis of KL Nanoparticles with a Diameter Size Ranging Between 9 nm and 45 nm 1 g of KL (BioPiva) was dissolved in 50 mL of DMSO so that an initial concentration of KL amounting to 20 mg/ml was obtained. The mixture was stirred at room temperature (25° C.) until a clear solution was obtained. Then the solution was added to a 1 L water reservoir, which was stirred at a speed of 1000 rpm at room temperature (25° C.). The temperature of the water reservoir was kept at 25° C. A glass syringe (50 mL) with a sharp needle (1.00*60 mm) was utilized for the addition of lignin solution into the water reservoir. The mixture was kept stirring for 1 minute. The KL nanoparticles formation took place immediately after the complete addition of KL solution. Then DMSO was removed using dialysis at room temperature for 4 days. After that, water dispersed KL nanoparticles were frozen at -80° C. overnight using a freezer. Finally, the frozen KL nanoparticles were freeze-dried at 0.001 mbar and -110° C. for 4 days using freeze-drier (Christ: Alpha 3-4 LSC basic). Fluffy dried powder samples were stored in glass vials. The final yield of the sample was 90%.

The DLS analysis, indicated in FIG. 1, confirms that the hydrodynamic radius of the KL nanoparticles is 55 nm with a narrow polydispersity index of 0.18.

Figure 2:
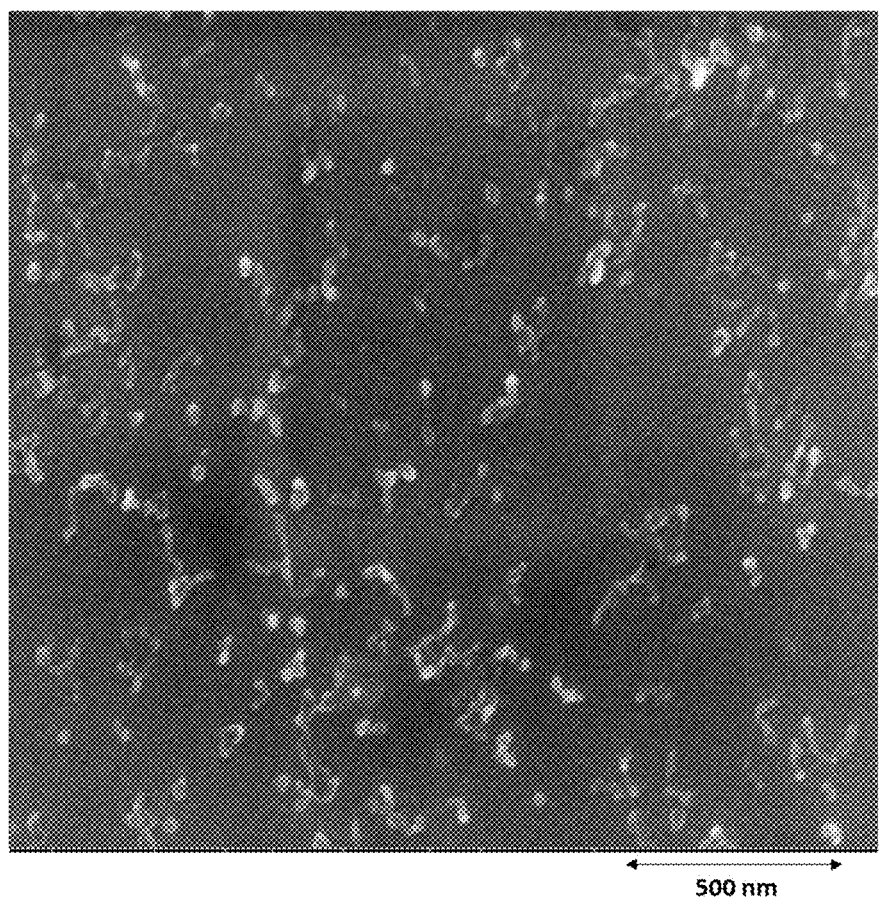
FIG. 2 is a SEM image of KL nanoparticles fabricated using DMSO.

The SEM analysis, shown in FIG. 2, confirmed that the average diameter size of the dried KL nanoparticles is 15 nm. Most of the nanoparticles, namely between 80% and 90% of the nanoparticles, present an average diameter size which is 15 nm, also confirming the narrow polydispersity index of 0.18.

Figure 3:
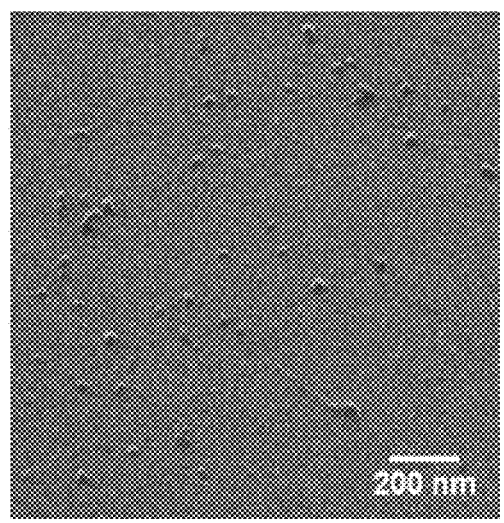
FIG. 3 is a Helium Ion Microscopy (HIM) image of KL nanoparticles fabricated using DMSO.

The HIM analysis, shown in FIG. 3, also confirmed that the average diameter size of the dried KL nanoparticles is about 15 nm (more specifically 17 nm, with a standard deviation of 8 nm). HIM analysis is therefore a confirmation that KL nanoparticles having an average diameter size as low as 9 nm or 10 nm can be obtained. The HIM analysis further confirms the sphericity of the KL nanoparticles fabricated using the DMSO system.

Synthesis of KL Nanoparticles with a Diameter Size Ranging Between 35 nm and 70 nm 1 g of KL (BioPiva) was dissolved in 50 mL of THF, so that an initial concentration of KL amounting to 20 mg/ml was obtained. The mixture was stirred at room temperature (25° C.) until a clear solution was obtained. Then the solution was added to 1 L of a cooled water reservoir, which was stirred at a speed of 1000 rpm. The temperature of the water reservoir was kept at 10° C. A glass syringe (50 mL) with a sharp needle (1.00*60 mm) was utilized for the addition of lignin solution into the water reservoir. The mixture was kept stirring for 1 minute. The KL nanoparticles formation took place immediately after the complete addition of KL solution. Particle size was characterized using dynamic light scattering (DLS). Then THF was removed using a rotary evaporator. After that, water dispersed KL nanoparticles were frozen at -80° C. for overnight using a freezer. Finally, the frozen LNPs were freeze-dried at 0.001 mbar and -110° C. for 3 days using freeze-drier (Christ: Alpha 3-4 LSC basic). Fluffy dried powder samples were stored in glass vials. The final yield of the sample was 80%.

Figure 4:
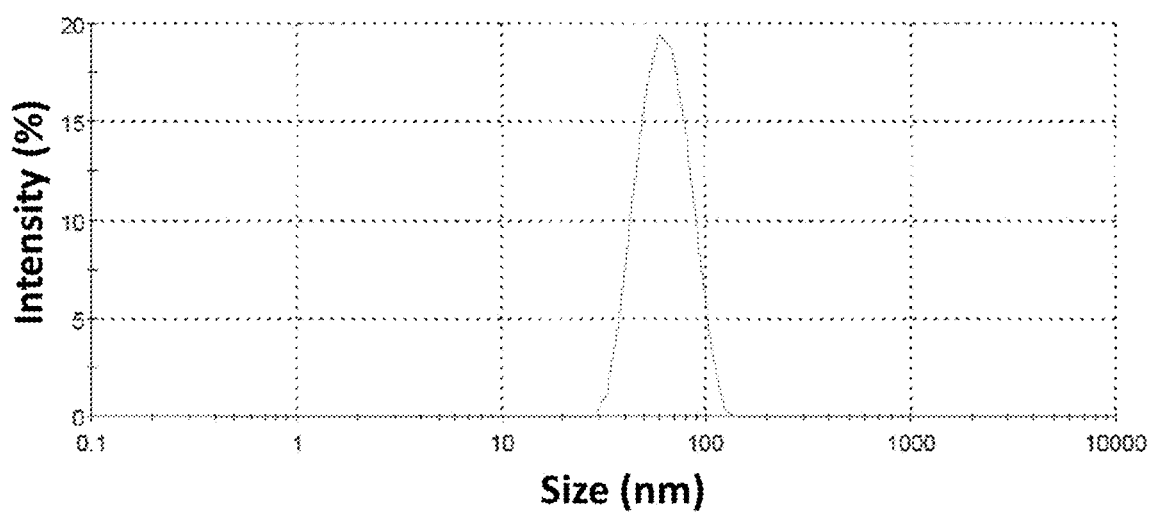
FIG. 4 is a DLS spectrum of KL nanoparticles fabricated using THF.

FIG. 4 indicates the DLS spectrum of the KL nanoparticles presenting a hydrodynamic radius of 80 nm with a narrow PDI of 0.15.

Figure 5:
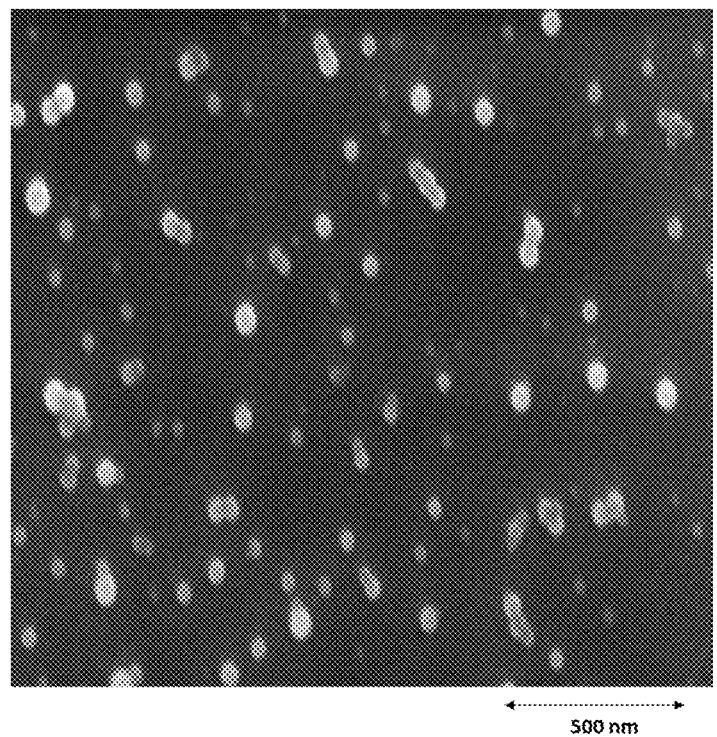
FIG. 5 is a SEM image of KL nanoparticles fabricated using THF.
Figure 6:
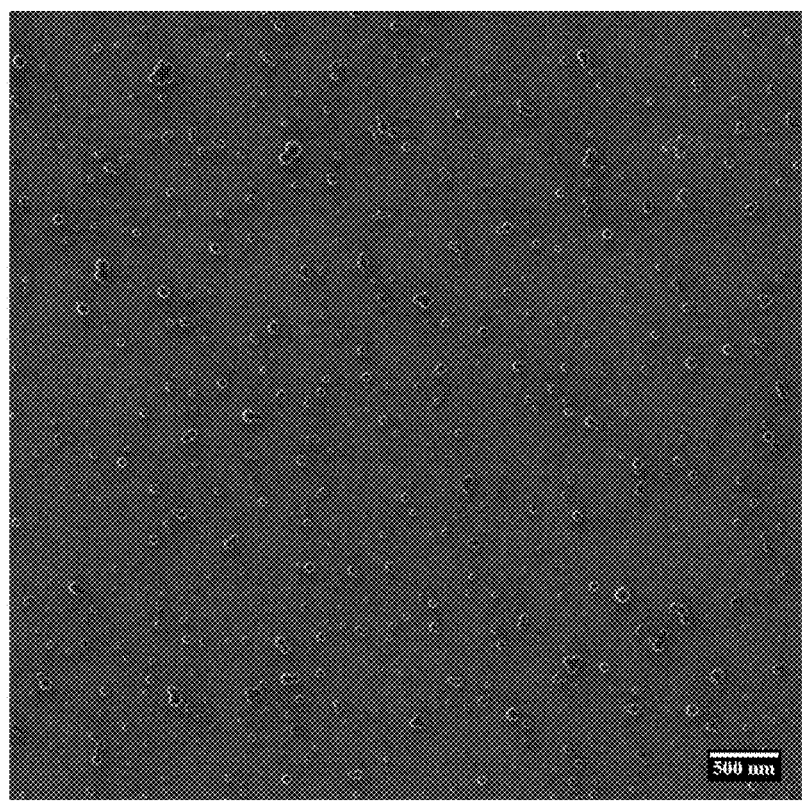
FIG. 6 is a HIM image of KL nanoparticles fabricated using THF.

The SEM image is given in FIG. 5 and confirms that the average diameter size of the dried KL nanoparticles is ranging between 50 nm and 70 nm, and is more particularly 60 nm. A refinement of this size has been done by determining the size with HIM, as this was the case for the KL nanoparticles obtained from the DMSO system. The HIM analysis, presented in FIG. 6, thus shows that the average diameter size of the dried KL nanoparticles is ranging between 35 nm and 65 nm, and is more particularly 43 nm.

The removal of THF, using roto-evaporation, is easier in comparison with the synthesis of the KL nanoparticles in DMSO, where DMSO is removed using dialysis. However, the use of DMSO is interesting since it is more environment-friendly than THF.

Additional Characterization of the KL Nanoparticles by Absorption Analysis

Figure 7:
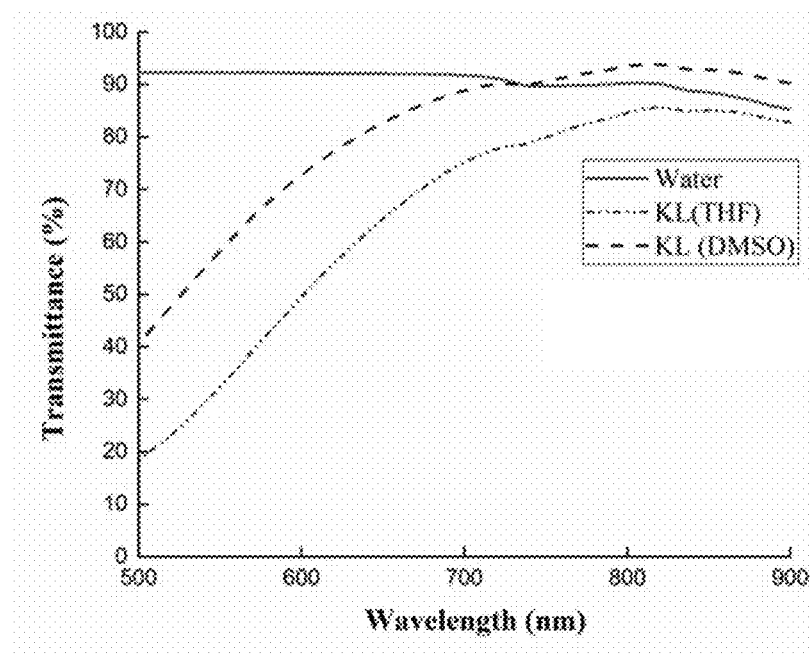
FIG. 7 is Transmittance measurements of KL nanoparticles of the present disclosure.

The KL nanoparticles, dispersed in water, which have an average diameter size below 60 nm, do not coalesce together nor form aggregates. FIG. 7 shows the transmittance of incident light having a wavelength ranging between 500 nm and 900 nm measured on the KL nanoparticles. This analysis was performed at an initial lignin concentration of 20 mg/mL. Table 1 indicates the obtained results at 600 nm.

TABLE 1

Transmittance measurements

| Sample | Size[a] | transmittance at 600 nm[b] |
|---|---|---|
| water | n.a.[c] | 92% |
| KL (THF) | 60 nm | 49% |
| KL (DMSO) | 15 nm | 72% |

Figure 8:
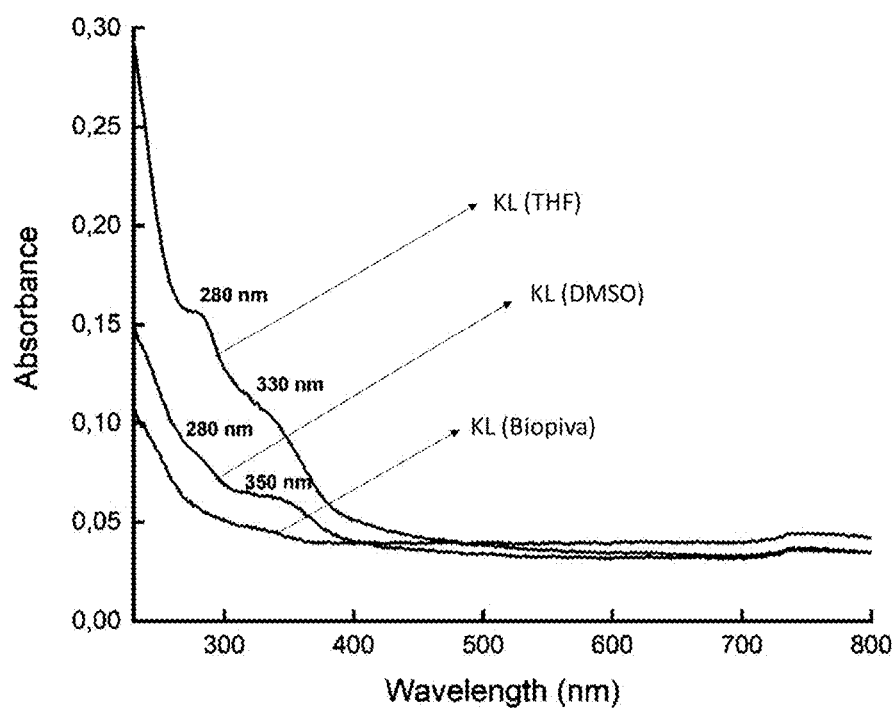
FIG. 8 is a UV Visible spectrum of KL nanoparticles of the present disclosure.

[a]as determined by Scanning Electron Microscopy
[b]as determined by Absorption analysis
[c]non-applicable Additional Characterization of the KL Nanoparticles by UV As KL is an organic compound comprising aromatic structures, UV-Visible analyses have revealed that there is the presence of two different kinds of π-π stacking in the KL nanofabrication. FIG. 8 shows that the UV visible spectrum of the KL nanoparticles fabricated in THF and DMSO (in comparison with the spectrum of the KL) and the absorbance at 280 nm indicates the presence of J aggregates, namely parallel-displaced compounds. Such absorbance in lignin nanoparticles has already been reported in the study entitled "Preparation and characterization of lignin nanoparticles: evaluation of their potential as antioxidants and UV protectants", by Rao Yearla S. et al. (J. Exp. Nanosci., 2016, 11 (4), 289-302).

A second type of π-π stacking has been observed by UV-Visible analysis, at a wavelength ranging between 315 nm and 365 nm, more specifically at 330 nm for the KL nanoparticles fabricated using THF and at 350 nm for the KL nanoparticles fabricated using DMSO. Since the H aggregates reflect the repulsive forces caused by a symmetric cloud of molecules, it is assumed that the absorbance at 350 nm is due to the H aggregates occurring when DMSO is used to dissolve KL. The absorbance at 330 nm is rather due to the T-shaped structure occurring when THF has been employed to fabricate the KL nanoparticles, since it reflects the asymmetricity in the formation of KL nanoparticles, probably due to a lack of diffusion in comparison with the system where DMSO is used.

Additional Characterization of the KL Nanoparticles by DSC

Figure 9:
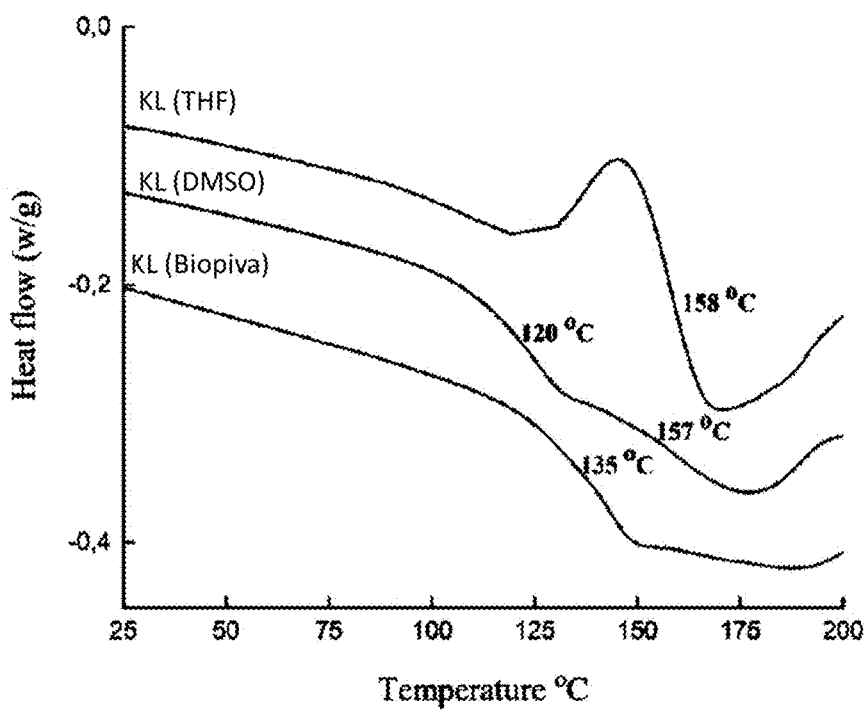
FIG. 9 is Differential Scanning Calorimetry (DSC) curves of KL nanoparticles of the disclosure.

FIG. 9 shows the DSC curve of the KL nanoparticles of the disclosure in comparison with KL and reveals that the KL nanoparticles have a glass transition temperature ($T_g$) of 157° C. and 158° C. for the KL nanoparticles fabricated respectively in DMSO and THF. This $T_g$ is higher than the $T_g$ for the KL. As an elevated $T_g$ is an indication that more energy is required to break the physical interaction between two components, it is remarkable that the thermal stability of the KL nanoparticles of the disclosure is considerably enhanced.

Moreover, for the KL nanoparticles fabricated in THF, the exothermic hump is the evidence of the energy release while de-structuring the self-assembly of the KL nanoparticles and the hump itself corroborates the assumption that the π-π stacking, determined thanks to the UV-Visible analysis, is of the T-shape.

For the KL nanoparticles fabricated in DMSO, a second $T_g$ has been observed at 120° C. The presence of two glass transition temperatures indicates that the KL nanoparticle comprises two segmental arrangements. $T_g$ at 120° C. reflects the π-π stacking of the H-type, since this kind of π-π stacking involves repulsive forces and thus demands less energy to break down. This second $T_g$ corresponds to the breakdown of the polymer chains that constitute the KL in the KL nanoparticles.

Additional Characterization of the KL Nanoparticles by TGA

Figure 10:
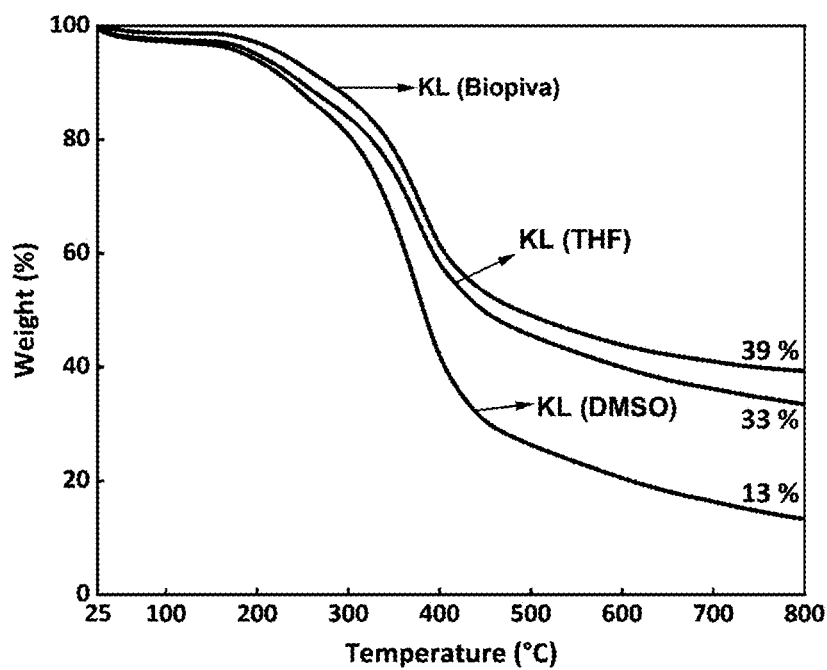
FIG. 10 is Thermogravimetric Analysis (TGA) curves of KL nanoparticles of the disclosure.

FIG. 10 shows the TGA analysis of the KL nanoparticles of the disclosure in comparison with the KL. As displayed, the degradation of KL starts from 220° C. 39% char yield of KL is observed. The KL nanoparticles fabricated in DMSO and THF have a similar curve, although more stable than KL, with respectively 13% char yield and 33% char yield. % char yield is equivalent to the residual weight % of the material on which the TGA analysis is carried out. The smaller nanoparticles have a higher surface area and high thermal conductivity, which catalyzes their degradation.

Additional Characterization of the KL Nanoparticles by AFM

The bimodal AM-FM analyses allow to simultaneously obtain topography and elastic modulus (Young's modulus) images.

The bimodal AM-FM mode provides the quantitative mapping of the nanomechanical properties of a surface, as indicated in the study by Kocun M., et al. entitled "Fast, High Resolution, and Wide Modulus Range Nanomechanical Mapping with Bimodal Tapping Mode" (*ACS Nano*, 2017, 11 (10), 10097-10105).

The cantilever stiffness of the AFM tip (AC160TS, Olympus, Japan), $k_1$ (28.9 N/m), and $k_2$ (952 N/m), at its $1^{st}$ ($f_1$) and $2^{nd}$ ($f_2$) eigenmodes, as well as the inverse optical sensitivity, are calibrated using the Sadler non-contact method before the measurements. The quality factor $Q_1$ (406) is extracted during the amplitude tune of $A_{1,\,free}$ (160 nm) of the $1^{st}$ eigenmode.

The Hertz model for contact mechanics was applied for the analytical calculation of modulus mechanics (see studies of Benaglia S. et al., entitled "Fast and high-resolution mapping of elastic properties of biomolecules and polymers with bimodal AFM" (*Nat. Protoc.*, 2018, 13 (12), 2890-2907) and of Labuda A. et al., entitled "Generalized Hertz model for bimodal nanomechanical mapping" (*Beilstein J. Nanotechnol.*, 2016, 7, 970-982). The calibrated cantilever parameters ($k_1$, $k_2$, $f_1$, $f_2$ and $Q_1$), combined with readings collected during the analysis ($A_1$, $\varphi_1$ and $\Delta f_2$), allow the calculation of the indentation depth δ (Eq. 1) of the tip on the surface and the effective storage modulus $E_{eff}$ (Eq. 2).

In the case of flat punch tip:

$$\delta = \frac{3}{4}\frac{k_1}{Q_1}A_{1,free}\cos\varphi_1\frac{f_2}{2k_2\Delta f_2} \quad \text{Eq. 1}$$

$$E_{eff} = \sqrt{\frac{2}{3}}\frac{\pi}{R}\left(\frac{k_1}{Q_1}\frac{A_{1,free}}{A_{1,set}}\cos\varphi_1\right)^{-\frac{1}{2}}\left(2k_2\frac{\Delta f_2}{f_2}\right)^{\frac{3}{2}} \quad \text{Eq. 2}$$

From equation 2, the AFM tip radius (R) is the only free parameter to be determined and modelized as a flat punch. This parameter is determined by analysing a modulus reference sample (polystyrene/polycaprolactone). The EM of the polystyrene phase is 2.7 GPa and then the tip radius was extracted.

Figure 11:
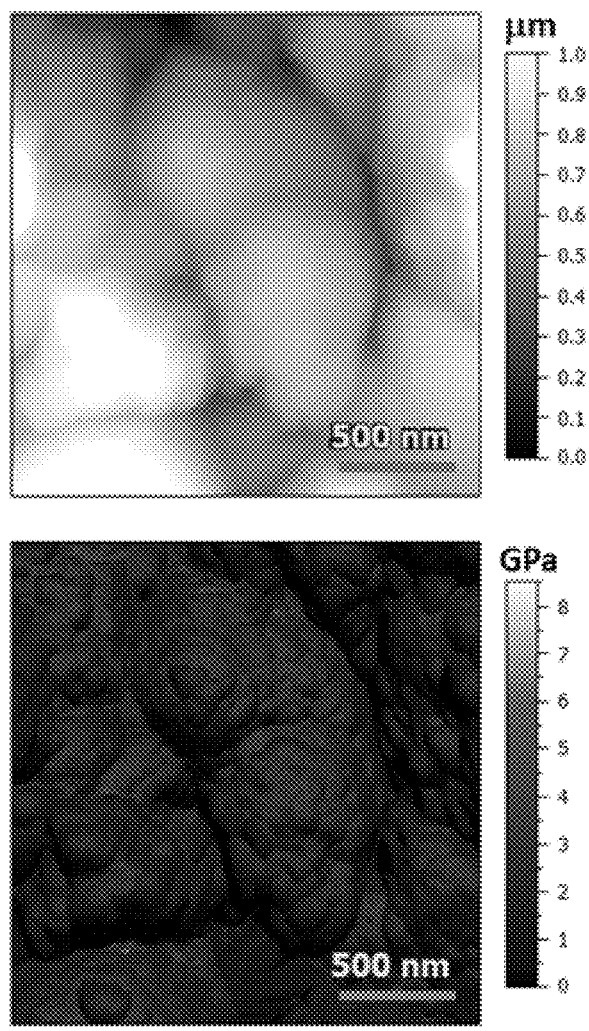
FIG. 11 is AFM studies showing the size and Young's modulus of raw KL.
Figure 12:
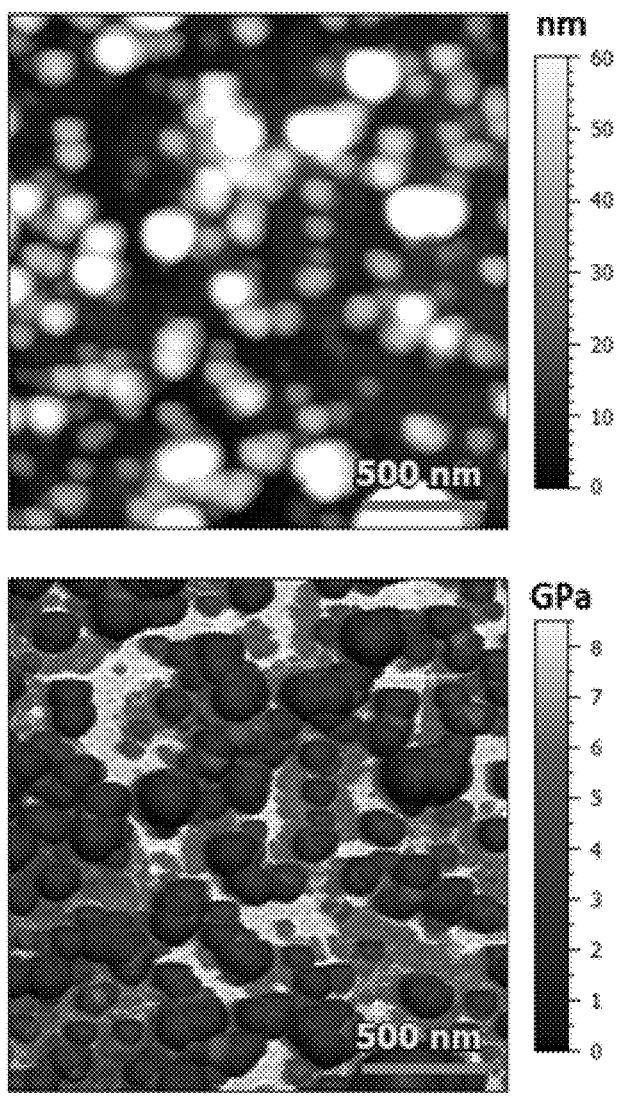
FIG. 12 is AFM studies showing the size and Young's modulus of KL nanoparticles generated using THF.
Figure 13:
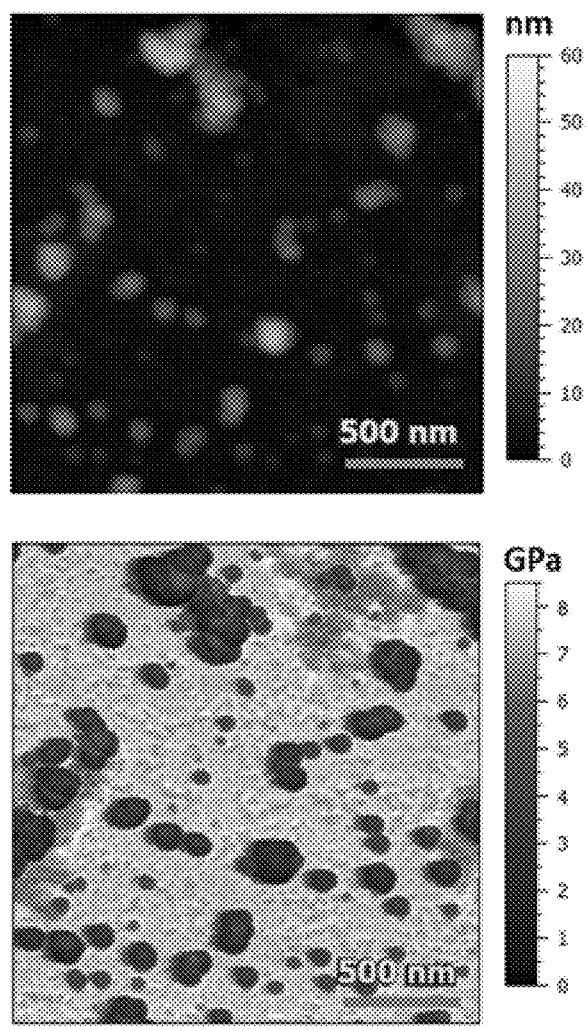
FIG. 13 is AFM studies showing the size and Young's modulus of KL nanoparticles generated using DMSO.
Figure 14:
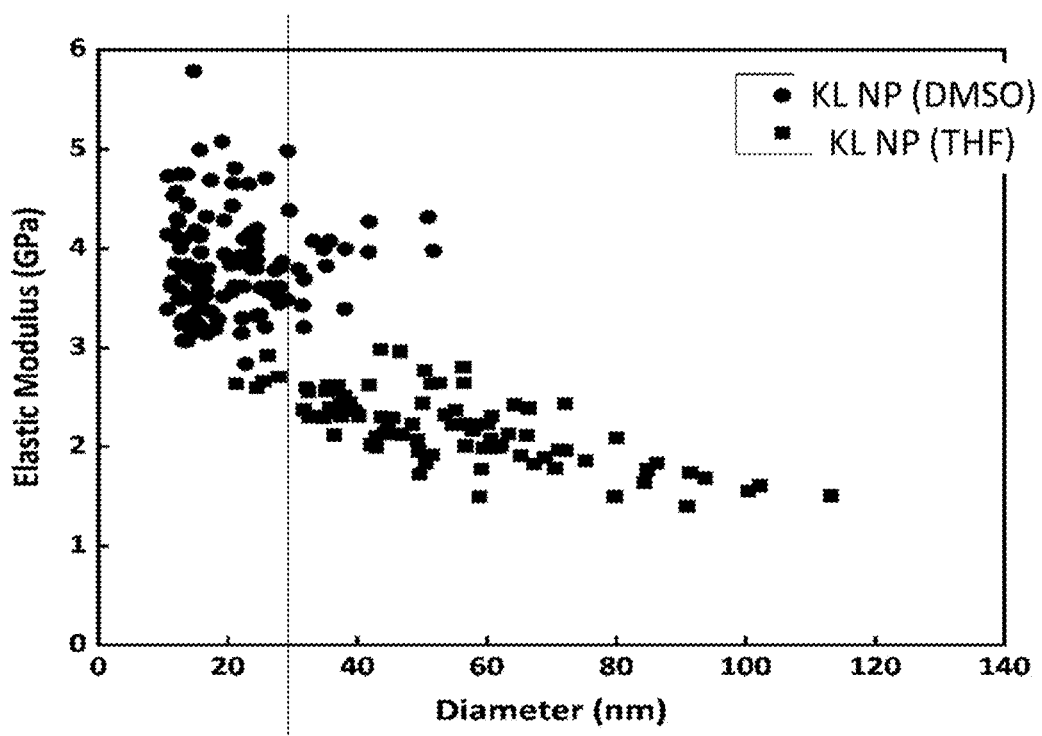
FIG. 14 is a correlation between size distribution and Young's modulus of the KL nanoparticles.

The indentation depth (δ: 800 μm) contributed to measure the sample topography. The effective storage modulus was calculated using the above-measured variables. The nanoparticles are individually segmented by a watershed mode in MountainSPIP 8 software (Digisurf, France). The mask obtained is then applied to the EM image to obtain maximum height (assumed to be the diameter) and the corresponding average EM of the same particle, as shown in FIG. 11 (for the raw KL), FIG. 12 (for the KL nanoparticles generated using the THF system) and FIG. 13 (for the KL nanoparticles generated using the DMSO system). FIG. 14 shows the KL nanoparticles size distribution correlated to Young's modulus derived from Atomic Force Microscopy experiments.

Therefore, it was determined that said KL nanoparticle has Young's modulus ranging between 1.0 GPa and 6.0 GPa as determined by Atomic Force Microscopy, preferentially between 1.4 GPa and 5.1 GPa, more preferentially between 1.5 GPa and 5.0 GPa.

For example, the KL nanoparticles generated using the THF system have Young's modulus ranging between 1.0 GPa and 3.0 GPa as determined by Atomic Force Microscopy, preferentially between 1.4 GPa and 2.9 GPa, more preferentially between 1.5 GPa and 2.8 GPa, even more preferentially between 1.6 GPa and 2.7 GPa.

For example, the KL nanoparticles generated using the DMSO system have Young's modulus ranging between 2.7 GPa and 6.0 GPa, preferentially between 2.8 GPa and 5.1 GPa, more preferentially between 2.9 GPa and 5.0 GPa, even more preferentially between 3.0 GPa and 4.9 GPa.

Compounding of Rubber Formulation

Microcompounding: A conical twin screw micro-compounder (Xplore 15 cc, DSM, Netherlands). The mixing conditions have been set to 250 rpm at 90° C. for 3 minutes. After the mixing, the rubber compound was passed 6 times between the two roll mills, maintained in a 2 mm gap at 50° C.

Brabender internal mixing: The mixing of the components was carried out in a rubber mixer of the type Haake PolyLab QC internal mixer (Thermo Scientific) with a Rheomix 600 mixing chamber volume of 85 ml. Three stages (stage 1 and 2 being non-productive stages, stage 3 being the productive mixing stage) of mixing were achieved for increasing the dispersion of the ingredients. In between each stage, the rubber compound is sheeted out in a two-roll mill (Servitec Maschinenservice GmbH—Polymix 110L) and cooled for 30 minutes at room temperature. Table 2 shows 7 different compositions where only the parts per hundred rubber (phr) of dual fillers were changed and all the other ingredients were kept constant.

TABLE 2

Formulation and mixing stages of the rubber compositions a to g

| Stages of mixing | Compounding Ingredients | a | b | c | d | e | f | g |
|---|---|---|---|---|---|---|---|---|
| NP1 | SLR 3402[1] | 100 | 100 | 100 | 100 | 100 | 100 | 100 |
| | TDAE Oil[2] | 14 | 14 | 14 | 14 | 14 | 14 | 14 |
| | RO PR383[3] | 40 | 40 | 40 | 40 | 40 | 40 | 40 |
| | SA[4] | 2.5 | 2.5 | 2.5 | 2.5 | 2.5 | 2.5 | 2.5 |
| | Zeosil 200MP[5] | 90 | 90 | 80 | 90 | 80 | 90 | 80 |
| | KL/KLNPs[6] | 0 | 10 | 10 | 10 | 10 | 10 | 10 |
| NP2 | 6PPD[7] | 4 | 4 | 4 | 4 | 4 | 4 | 4 |
| | RO PR383[3] | 12 | 12 | 12 | 12 | 12 | 12 | 12 |
| | TESPD (Si266)[8] | 12.5 | 12.5 | 12.5 | 12.5 | 12.5 | 12.5 | 12.5 |
| | Zeosil 200MP[5] | 35 | 35 | 35 | 35 | 35 | 35 | 35 |
| PR | $ZnO_2$[9] | 2.5 | 2.5 | 2.5 | 2.5 | 2.5 | 2.5 | 2.5 |
| | Sulfur[10] | 1.6 | 1.6 | 1.6 | 1.6 | 1.6 | 1.6 | 1.6 |
| | DPG[11] | 3 | 3 | 3 | 3 | 3 | 3 | 3 |
| | CBS[12] | 3 | 3 | 3 | 3 | 3 | 3 | 3 |

[1]SSBR
[2]process oil, from PSP specialties
[3]performance modifier resin, Resin OPPERA (RO) PR 383 from ExxonMobil
[4]stearic acid (activator for $ZnO_2$), from Godrej industries
[5]Precipitated synthetic amorphous silica (Zeosil Premium 200MP), from Solvay
[6]KL: bulk Kraft lignin; KLNPs: Kraft lignin nanoparticles
[7]antiozonant, antioxidant: N-(1,3-dimethylbutyl)-N'-phenyl-p-phenylenediamine (6PPD), from Eastman
[8]silane (compatibilizer/coupling agent): Bis(triethoxysilylpropyl)polysulfide from Evonik
[9]$ZnO_2$: activator of the sulphur vulcanization, from Hepşen Kimya
[10]$S_8$ (curing/vulcanization agent) from Grupa Azoty Siarkopol
[11]rubber cure accelerator: diphenyl guanidine, from Draslovka
[12]rubber cure accelerator: N-cyclohexyl-2-benzothiazole sulfenamide, from Kemai Chemical The seven different compositions a to g of table 2 are as follows:
- a: $^{125}$Si (Control) (i.e., 125 phr of silica into the rubber composition)
- b: $^{ON}KLNP_{43\ nm}$ (10 phr of 43 nm KLNPs on top of silica) (i.e., 125 phr of silica and 10 phr of $KLNP_{43\ nm}$ into the rubber composition)
- c: $^{IN}KLNP_{43\ nm}$ (10 phr of 43 nm KLNPs replacing silica) (i.e., 115 phr of silica and 10 phr of $KLNP_{43\ nm}$ into the rubber composition)
- d: $^{ON}KL_{bulk}$ (10 phr of KL on top of silica),
- e: $^{IN}KL_{bulk}$ (10 phr of KL replacing silica),
- f: $^{ON}KLNP_{17\ nm}$ (10 phr of 17 nm KLNPs on top of silica),
- g: $^{IN}KLNP_{17\ nm}$ (10 phr of 17 nm KLNPs replacing silica).

Figure 15:
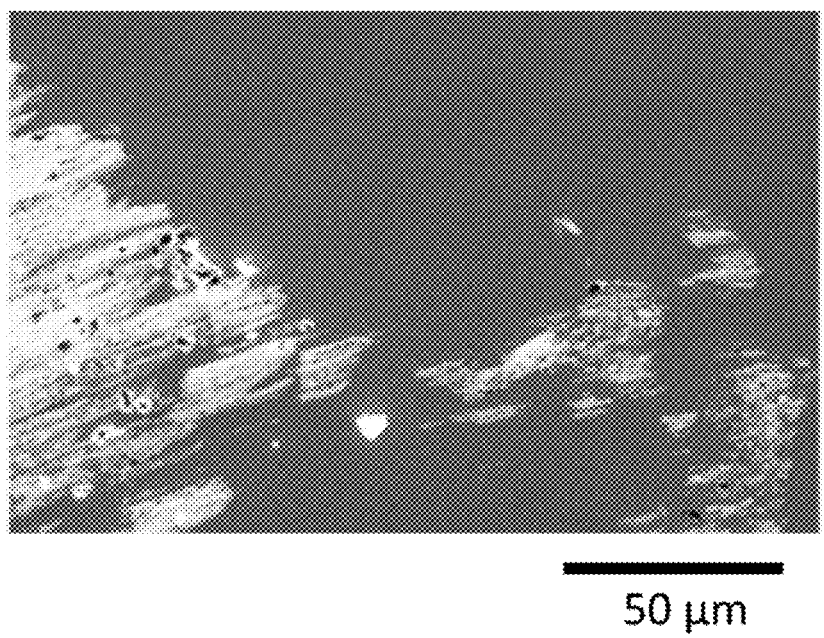
FIG. 15 is a SEM image of a control rubber formulation having no reinforcement materials.
Figure 16:
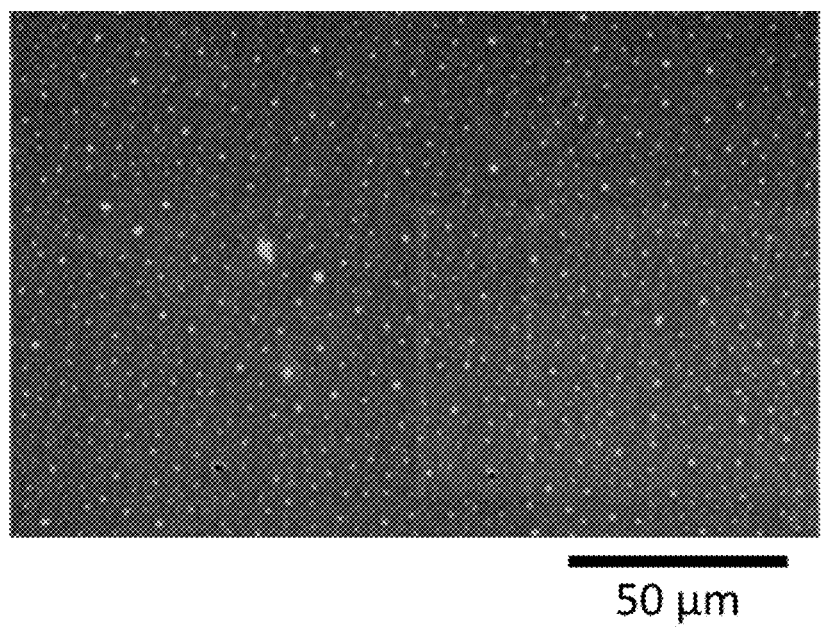
FIG. 16 is a SEM image of $KLNP_{43\ nm}$ uniformly dispersed and distributed throughout the non-polar rubber matrix.
Figure 17:
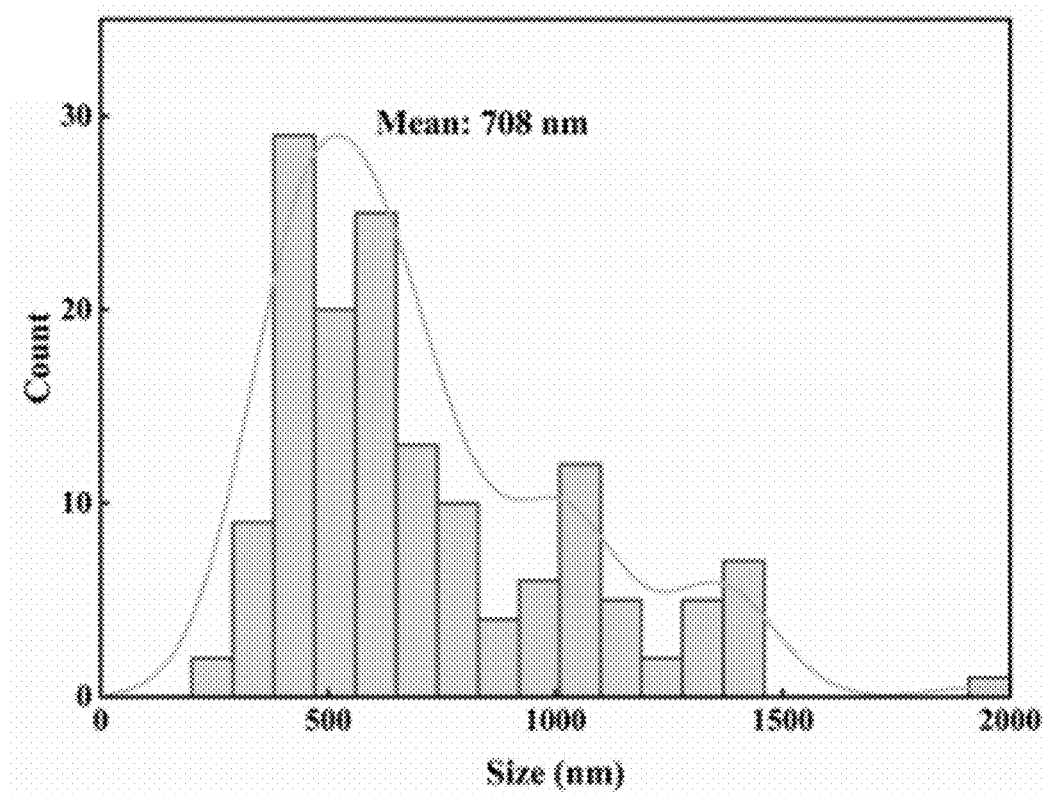
FIG. 17 is a size distribution of the $KLNP_{43\ nm}$ within the non-polar rubber matrix.
Figure 18:
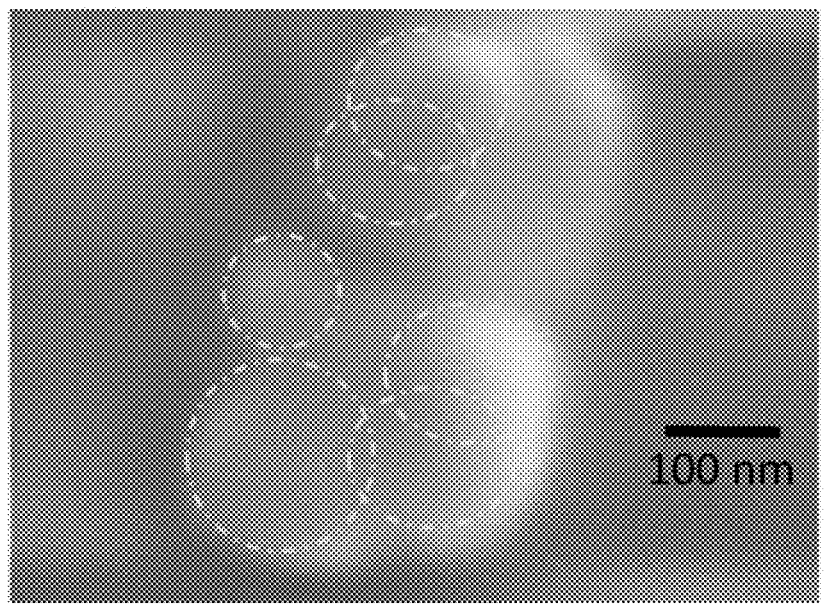
FIG. 18 is a SEM image of the KLNP after rubber mixing.
Figure 19:
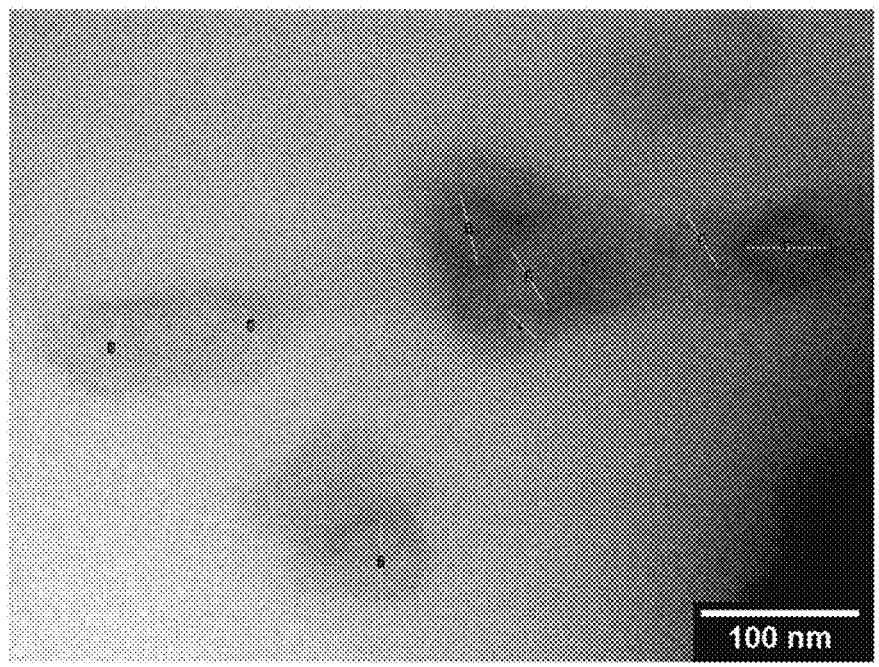
FIG. 19 is a STEM analysis of the $KLNP_{43\ nm}$ indicating the primary particles size after rubber mixing.

While KL (i.e., raw Kraft lignin) is prone to forming large aggregates (>10 mm) and poor dispersion in non-polar rubber, such as SSBR, KLNPs could further increase aggregation due to their size and high surface area. Using the KLNP obtained via the THF system or the DMSO system as explained above in this disclosure (microcompounding part), the microtome samples were analysed after mixing using SEM and STEM. FIG. 15 shows the SEM image of the control with a smooth sample surface with voids due to no fillers. FIG. 16 shows the SEM image of $KLNP_{43\ nm}$ which are uniformly dispersed and distributed throughout the non-polar rubber matrix with an average aggregate size of 708 nm, as indicated in FIG. 17. SEM imaging and STEM analysis have confirmed that the KLNPs keep their size integrity after rubber mixing, as respectively shown in FIGS. 18 and 19. Indeed, the average size of the marked particles obtained after rubber mixing is 44±10 nm. All these analyses confirm that dispersion of KLNPs into a rubber matrix has been achieved.

In the Brabender internal mixing formulation, the cure characteristics of KL/KLNPs-SSBR compounds were then evaluated.

Cure Time ($t_{90}$), Scorch Time ($t_{s2}$) and Cure Rate Index (CRI)

Figure 20:
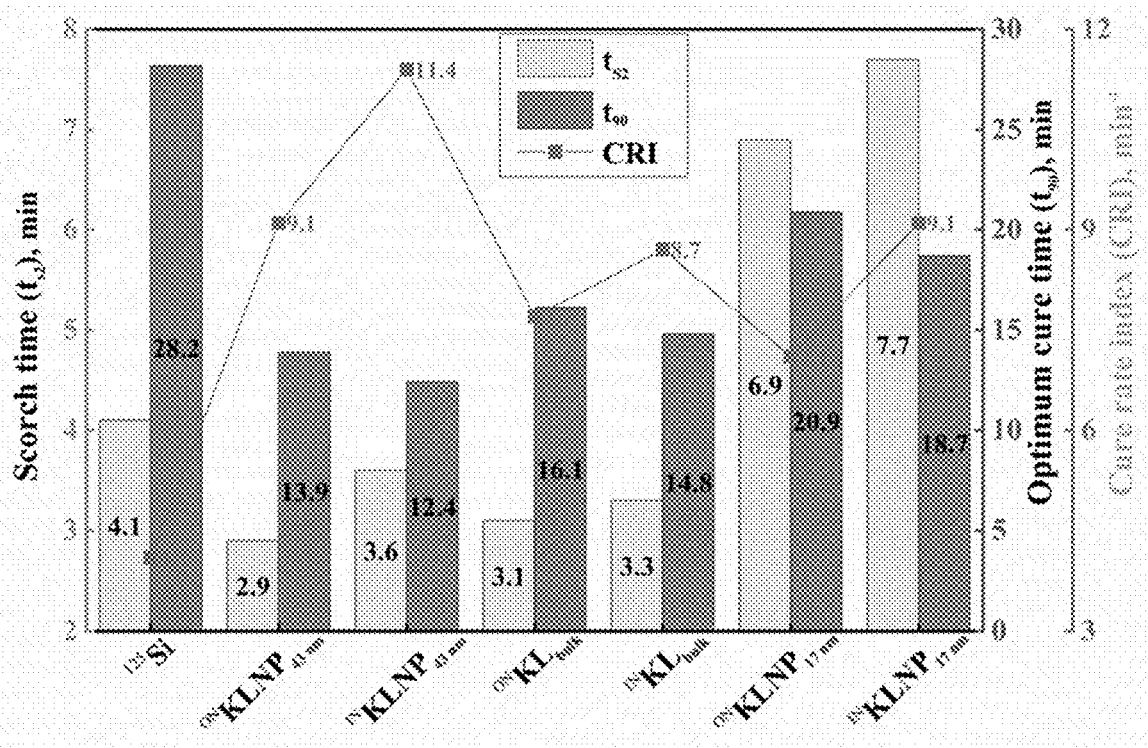
FIG. 20 is an indication of the cure time ($t_{90}$), the scorch time (ts2) and the cure rate index (CRI) obtained from moving die rheometer.

FIG. 20 demonstrates the cure time ($t_{90}$), scorch time ($t_{s2}$) and the cure rate index (CRI). The cure time ($t_{90}$) is the time that determines how long it takes to fully cure. The scorch time ($t_{s2}$) indicates the period at which a rubber compound can be processed at a given temperature before curing. The cure rate index (CRI) is derived from the cure time ($t_{90}$) and the scorch time ($t_{s2}$) according to the following formula: $CRI=((100)/(t_{90}-t_{s2}))$.

It was shown that all KL compounds significantly reduce the curing time ($t_{90}$) with respect to the control:

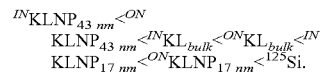

The minimum achieved $t_{90}$ is 12.4 min ($^{IN}KLNP_{43\ nm}$), while the control composition devoid of KLNPs has a $t_{90}$ amounting to 28.2 min. Such a 44% reduction in $t_{90}$ saves enormous energy consumption and increases tire compound production in industries.

It has been found that the addition of KLNPs to the 125 phr of silica (ON samples) required more cure time (t90) and more scorch time (ts2) than rubber composition in which 10 phr of silica have been substituted by 10 phr of KLNPs (IN samples). For example, $^{ON}KLNP_{43}$ nm required higher $t_{90}$ than $^{IN}KLNP_{43}$ nm (13.9>12.4 min). The presence of more filler (namely both silica and KLNPs) slightly increased the optimum cure time ($t_{90}$) and reduced scorch time ($t_{s2}$). Less $t_{s2}$ could impact the compound's self-life in case of storage. However, it substantially fastens the compound production. $^{IN}KLNP_{43\ nm}$ is the rubber composition with the optimum $t_{s2}$.

It was also demonstrated that there is a noticeable modulation in scorch time ($t_{s2}$) of all the rubber compositions:

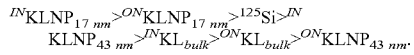
$KLNP_{43\ nm}>^{IN}KL_{bulk}>^{ON}KL_{bulk}>^{ON}KLNP_{43\ nm}$.

It has been further demonstrated that the CRI has increased for all the rubber compositions comprising Kraft lignin (by comparison with the control without KL).

The increased CRI and the reduced $t_{90}$ and modulated $t_{s2}$ evidence that the KL is catalyzing the curatives of the rubber formulation.

It is further mentioned that Lignin's catalytic poisoning and radical scavenging effects were not observed in all the compounds, probably due to the particularities of the Kraft lignin nanoparticles used in this present disclosure.

The Extent of the Cure

Figure 21:
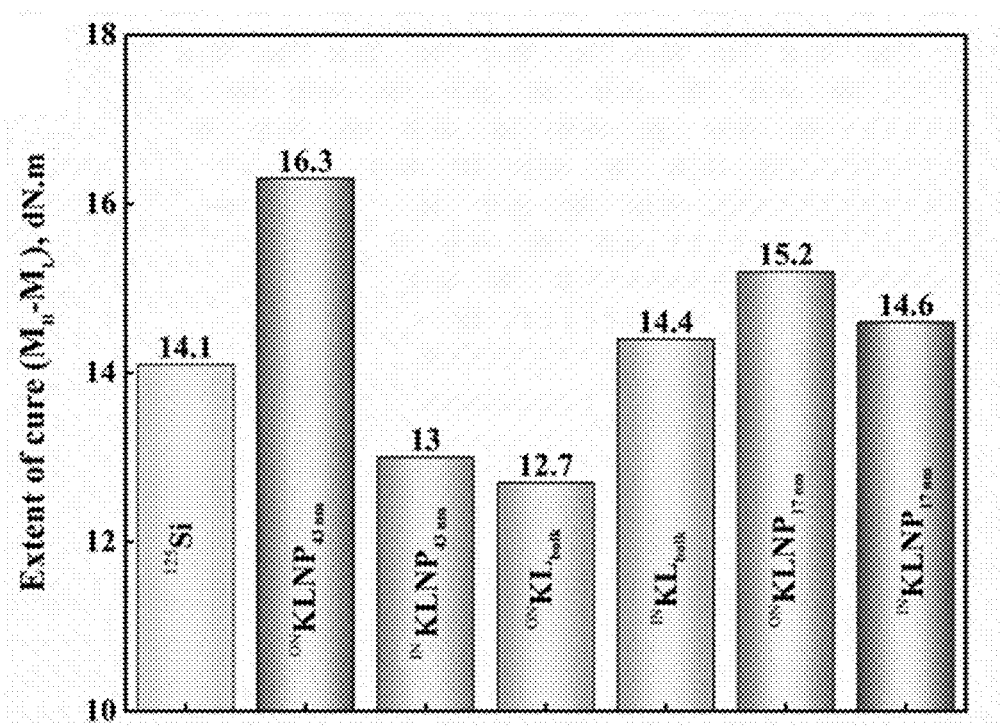
FIG. 21 is an indication of the extent of the cure.

An elevated extent of the cure corresponds to increased stiffness of the final rubber composition. The torque difference (MH–ML) provides the extent of cure (total crosslink density). FIG. 21 shows that the extent of the cure varies as follows:

$KLNP_{17\ nm}>^{IN}KL_{bulk}>^{125}Si>^{IN}$
$KLNP_{43\ nm}>^{ON}KL_{bulk}$.

Therefore, most of the KL/KLNPs compounds stiffen the SSBR composite.

Static Mechanical Properties of the Rubber Composition

Tensile Strength

The higher is the tensile strength, the better are the rubber-filler interactions and the filler dispersion.

Figure 22:
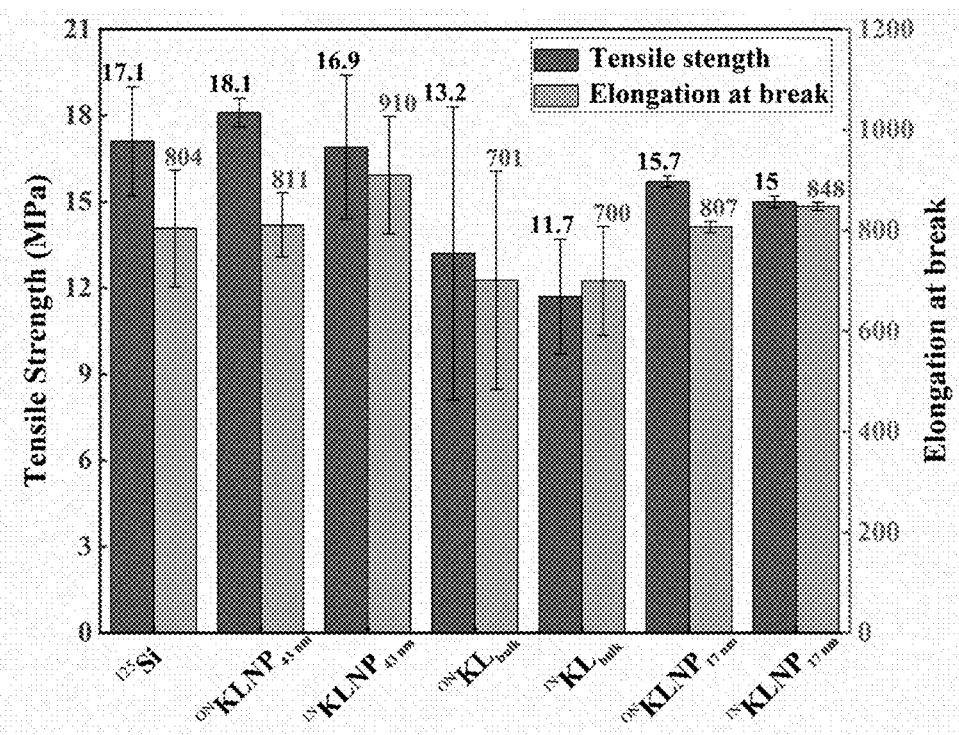
FIG. 22 is the tensile strength and elongation at break of the rubber composition.

FIG. 22 shows that the $^{ON}KLNP_{43\ nm}$ (18.1 MPa) shows better tensile strength than the control $^{125}Si$ (17.1 MPa). $^{IN}KLNP_{43\ nm}$ exhibit almost the same tensile strength (16.9 MPa) as control, indicating this could be a potential substitution of control. There is a slight reduction in the tensile strength of $^{ON}KLNP_{17\ nm}$ (15.7 MPa) and $^{IN}KLNP_{17\ nm}$ (15 MPa).

$^{ON}KL_{bulk}$ (13.2 MPa) and $^{IN}KL_{bulk}$ (11.7 MPa) exhibit poor tensile strengths.

Better tensile strength of $^{ON/IN}KLNP_{43\ nm}$ is a sign of good rubber-filler interactions and filler-dispersion. A slight reduction in the tensile strength of $^{ON/IN}KLNP_{17\ nm}$ could be because of a few aggregates and excessive stiffness of compounds that restrict the slippage of rubber chains.

Figure 24:
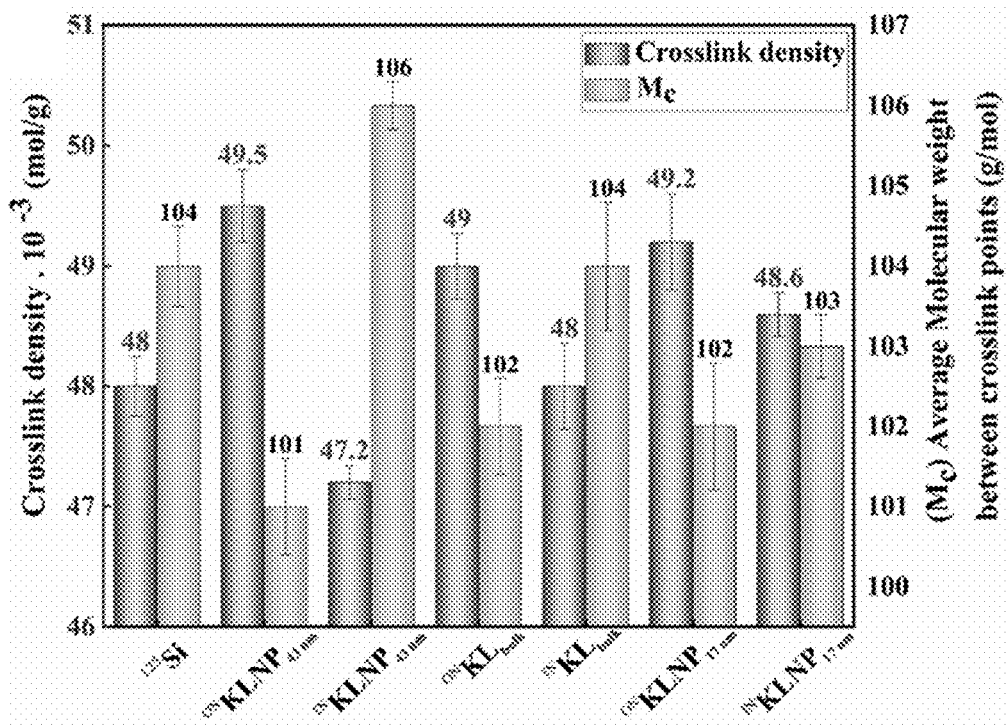
FIG. 24 is the crosslink density and average molecular weight between crosslink point of the rubber composition.

$^{IN}KLNP_{17\ nm}$ stiffness has increased due to the excessive crosslink density ($48.6 \times 10^{-3}$ mol/g, see FIG. 24).

Poor tensile strengths of $^{ON/IN}KL_{bulk}$ compounds indicate the presence of irregular agglomerates. Irregular agglomerates cannot transfer the stress from the matrix, resulting in premature failure.

Elongation at Break

The higher is the elongation at break, the better is the interface/filler dispersion.

In terms of elongation at break, FIG. 22 shows that most of the rubber compounds including Kraft lignin nanoparticles as described in the present disclosure exhibit better performance than the control:

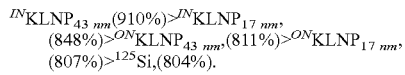
$(848\%)>^{ON}KLNP_{43\ nm}(811\%)>^{ON}KLNP_{17\ nm}$,
$(807\%)>^{125}Si,(804\%)$.

$KL_{bulk}$ exhibits poor performance ($^{ON}KL_{bulk}$, (701%) & $^{IN}KL_{bulk}$, (700%)).

$^{IN}KLNP_{43\ nm}$ exhibit more toughness (910%), outperforming the control. This extraordinary toughness of $^{IN}KLNP_{43\ nm}$ indicates the high stress-bearing and transferability, probably due to the better dispersion of fillers and reduced crosslink density ($47.2 \times 10^{-3}$ mol/g in FIG. 24).

$KL_{bulk}$ poor performance indicates the presence of large aggregates in the compounds that makes poor cohesion between the filler and rubber, leading to premature failure.

Reinforcing Index

Figure 23:
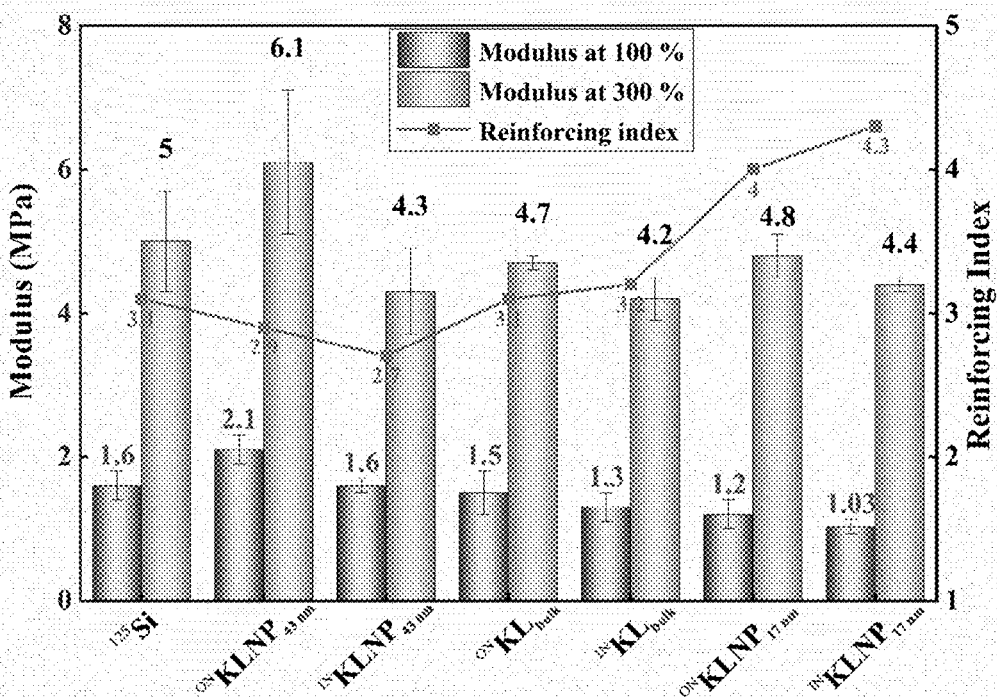
FIG. 23 is the reinforcing index from the modulus at 300% onto the modulus at 100%.

FIG. 23 shows the reinforcing index (RI) calculated for the rubber composition. It is calculated from the low strain modulus at (300%/100%).

Exceptionally, $^{ON}KLNP_{17\ nm}$ (4) and $^{IN}KLNP_{17\ nm}$ (4.3) show a better RI than the control.

Other rubber compositions including Kraft lignin show an almost equal RI to the control:

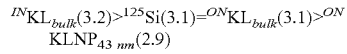
$KLNP_{43\ nm}(2.9)$

However, there is a slight reduction in $^{IN}KLNP_{43\ nm}$ (2.7). $^{ON/IN}KLNP_{17\ nm}$ exceptional RI is probably due to the combined effect of small size and excessive crosslinking density ($49.2 \times 10^{-3}$ and $48.6 \times 10^{-3}$ mol/g, see FIG. 24).

Almost equal RI indicates that the rubber compounds interface transfers the stress uniformly at low strains (100-300%), irrespective of filler dispersions.

A marginal reduction in $^{IN}KLNP_{43\ nm}$ is probably due to the reduced crosslink density ($47.2 \times 10^{-3}$ mol/g, see FIG. 24).

Crosslink Density and Swelling Properties of the Rubber Composition

The crosslink density is defined by the density of chains or segments that connect two infinite parts of the polymer network, rather than the density of crosslink junctures. The crosslink density is affected by the functionality of the cross-linker molecule. The higher is the crosslink density, the higher is the maximum shear modulus.

The sulfur-rubber crosslinking, silica-rubber, lignin-rubber, and the silica-lignin interactions could modulate the crosslinking density of the SBR composite.

FIG. 24 shows that the increasing filler loading increases the crosslinking density:

$^{ON}KLNP_{43\ nm}>^{ON}KLNP_{bulk}>^{ON}KLNP_{17\ nm}$ are higher than control $^{125}Si$.

There is a slight reduction in the crosslink density of $^{IN}KLNP_{43\ nm}$, which provides toughness to the composites. Surprisingly, even by replacing silica, $^{IN}KLNP_{bulk}$ and $^{IN}KLNP_{17\ nm}$ have equal ($48 \times 10^{-3}$ mol/g) and higher ($48.6 \times 10^{-3}$ mol/g) crosslink density than the control, respectively. This evidence that the KLNPs could cross-link with SSBR.

Figure 25:
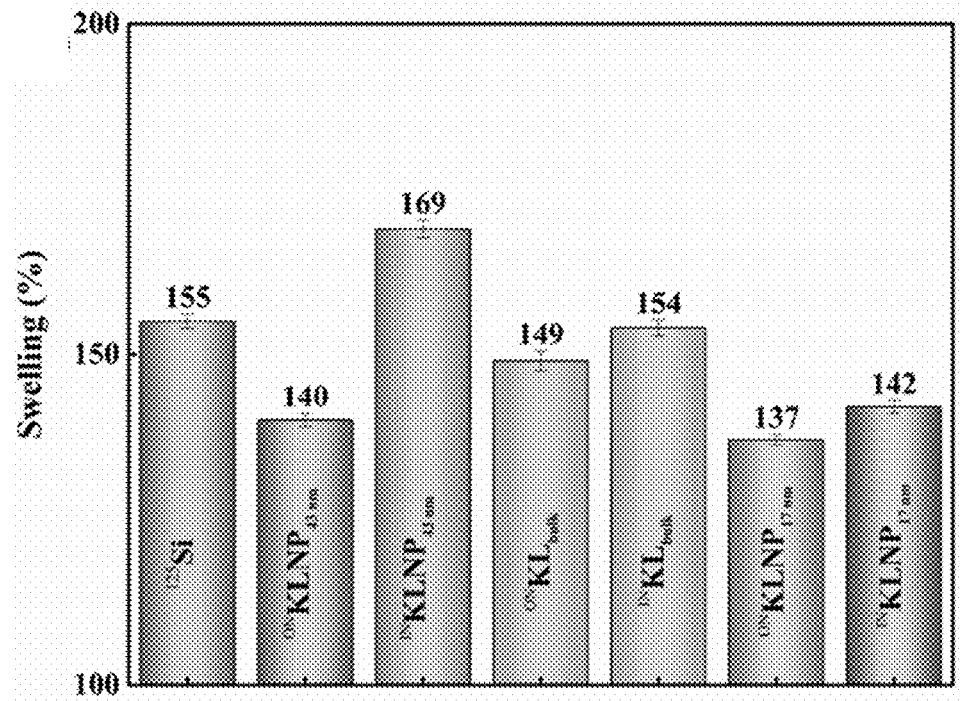
FIG. 25 is the swelling index of the rubber composition in toluene.

The more filler reduces the composite's swelling index by preventing the solvent penetration, as shown in FIG. 25.

Surface Hardness

Figure 26:
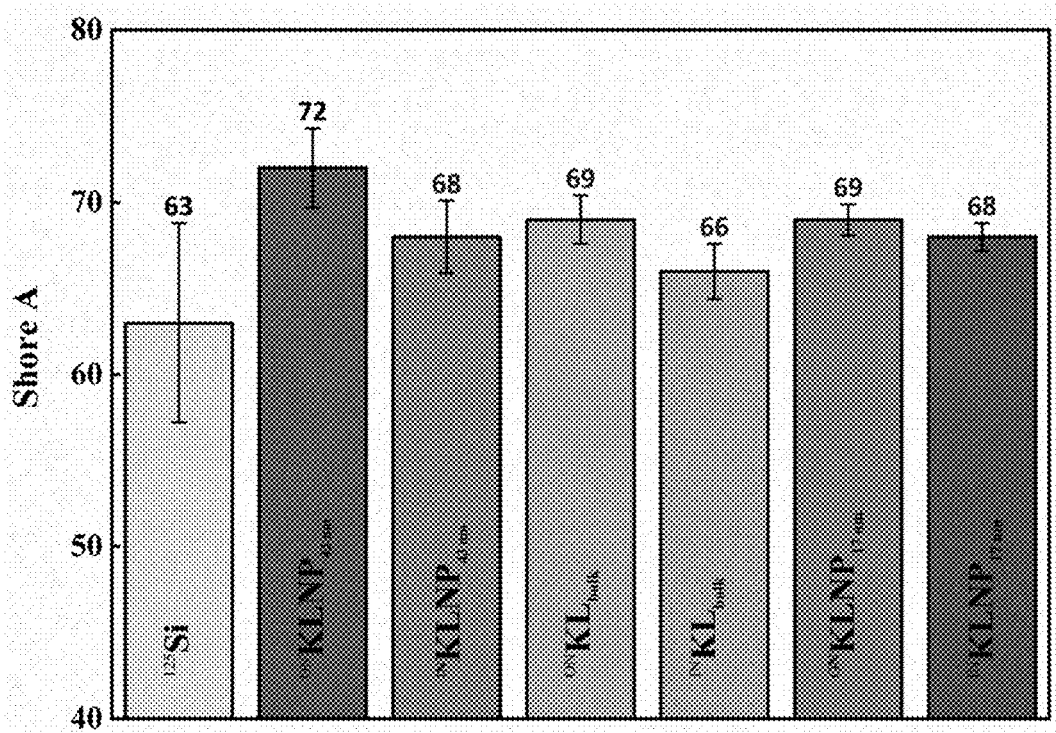
FIG. 26 is the shore A hardness of the rubber composition.

The sample's resistance force is measured as a value of Shore A (5-100) that has no units. All KL compounds show higher surface hardness than the control (see FIG. 26), due to the high inherent stiffness of the KL/KLNPs (1.5 to 4 GPa). The surface hardness of the rubber compounds is dependent on its young's modulus and the surface area of the filler used (ISO 48). There is no significant difference among the KL/KLNPs compounds. However, KL/KLNP compounds surface hardness is more homogeneous than control.

Payne Effect

The Payne effect is a dependence of the viscoelastic storage modulus on the amplitude of the applied strain. The measure of the amplitude of Payne effect (ΔE') is extensively used to interpret the filler micro-dispersions (filler-filler and filler-rubber interactions) in polymers. The difference in storage moduli at low (E'@1%) and high (E'@8%) strains determine the amplitude of the Payne effect (ΔE'=E'@1%–E'@8%). The larger (ΔE') indicates the strong filler-filler interaction and weak filler-polymer interactions, and vice versa. For compounds to have good dynamic visco-elastic properties, weak filler-filler interaction and strong filler-polymer interaction are desirable.

Figure 27:
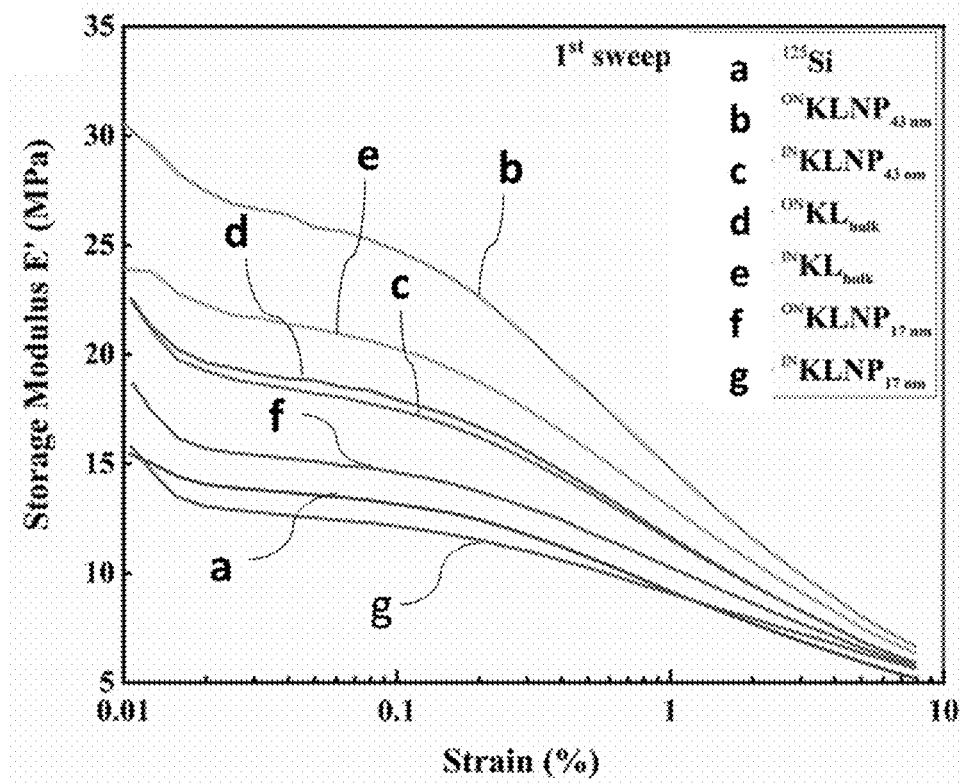
FIG. 27 is the storage modulus in function of strain of the rubber composition ($1^{st}$ sweep)
Figure 28:
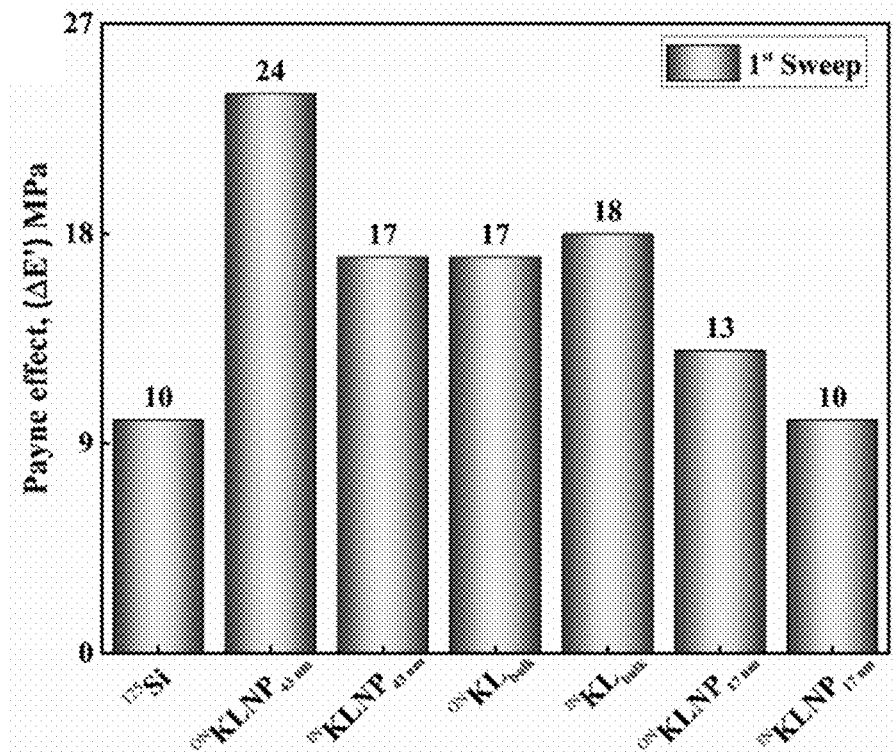
FIG. 28 is the Payne effect after the $1^{st}$ sweep of the rubber composition.

The $1^{st}$ sweep was used to eliminate the irreversible changes in microstructure (FIGS. 27 and 28).

Figure 29:
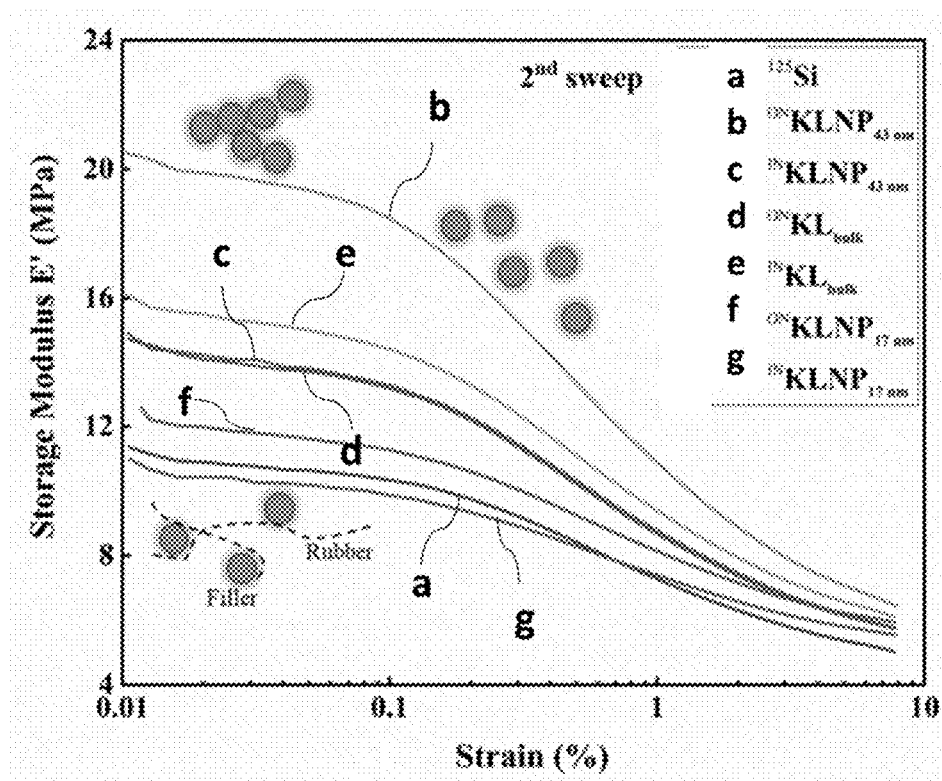
FIG. 29 is the storage modulus in function of strain of the rubber composition ($2^{nd}$ sweep)
Figure 30:
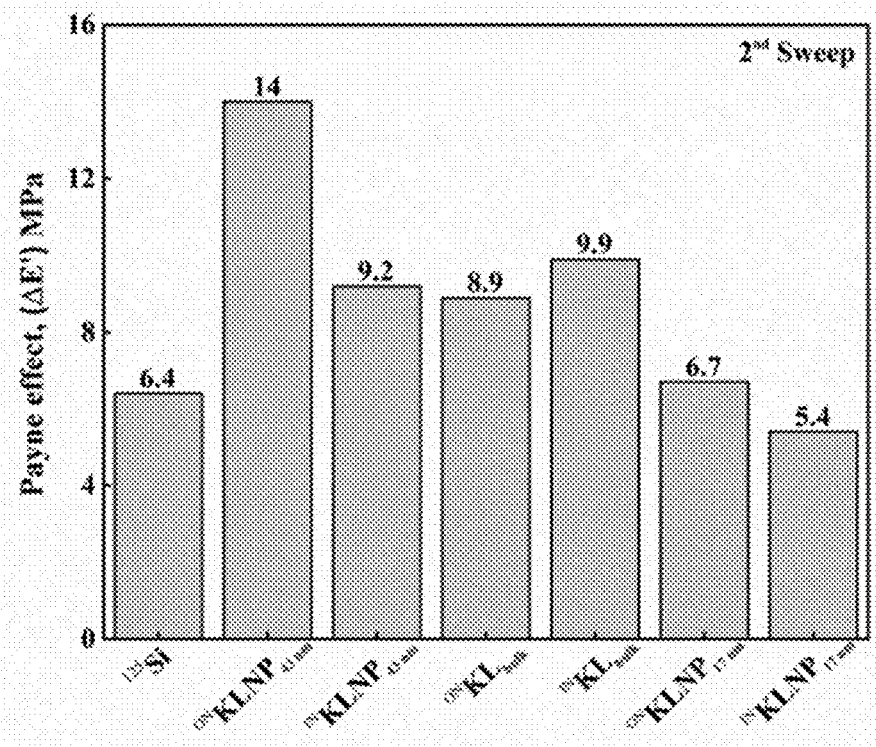
FIG. 30 is the Payne effect after the $2^{nd}$ sweep of the rubber composition.

The $2^{nd}$ sweep ΔE' measurement is reversible and reproducible (FIGS. 29 and 30).

$^{ON}KLNP_{43\ nm}$ shows the highest Payne effect (14), indicating that it contains high filler-filler interaction. The presence of more hybrid fillers certainly increases the (intra and inter) interaction between them. The hydroxyl groups of KL groups could interact with the unreacted silica (OH) group via hydrogen bonding.

$^{IN}KLNP_{43\ nm}$ shows 34% drop in the filler-filler interaction that indicates it has less filler-rubber interaction than the $^{ON}KLNP_{43\ nm}$, although, it is still higher than the control (6.4).

$^{ON}KL_{bulk}$ (8.9) and $^{IN}KL_{bulk}$ (9.9) exhibit similar ΔE' to $^{IN}KLNP_{43\ nm}$.

However, extraordinarily, $^{ON}KLNP_{17\ nm}$ (6.7) and $^{IN}KLNP_{17\ nm}$ (5.4) exhibits almost equal and lower value than the control (6.4). Such a lower value indicates that the $KLNP_{17\ nm}$ interacts much more with the rubber than any other fillers, this could be due to the crosslinking with the rubber. Especially in tire tread compounds, the filler dispersion (Payne effect) is the key factor behind the energy dissipation/rolling resistance. Low filler-filler interactions compounds are expected to exhibit low energy dissipation and reduced rolling resistance, and vice versa. Thus, the Payne effect can be tuned by the choice of different KL and filler loading.

Dynamic Mechanical Analysis

Figure 31:
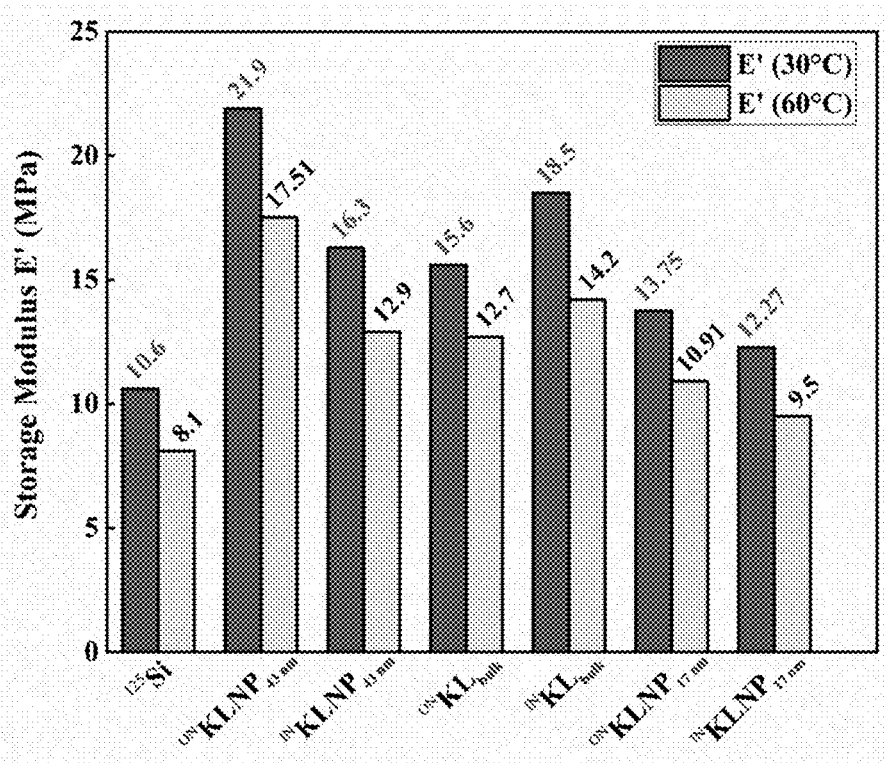
FIG. 31 is the storage modulus at 30° C. and at 60° C. of the rubber composition.

The storage modulus (E') or the elastic modulus of all the samples was measured at 30° C. and 60° C. The E' of highly filled silica composites reduces over the range of increasing temperature. FIG. 31 shows that the storage modulus of all the KL compounds is higher (for example, E' of $^{ON}KLNP_{43\ nm}$ is 116% of the E' of the control) than the control. A similar trend is observed at 30° C. KLNP significantly increased the E' by restricting the rubber chain mobility, which may be due to the combined effects of three following factors: (1) crosslink density or chain entanglements (2) hydrodynamic reinforcement, (3) interphases (occluded, bound, and glassy shell rubber). Such enhanced E' indicates the higher ability of the KL compounds to store energy and to increase stiffness.

Figure 32:
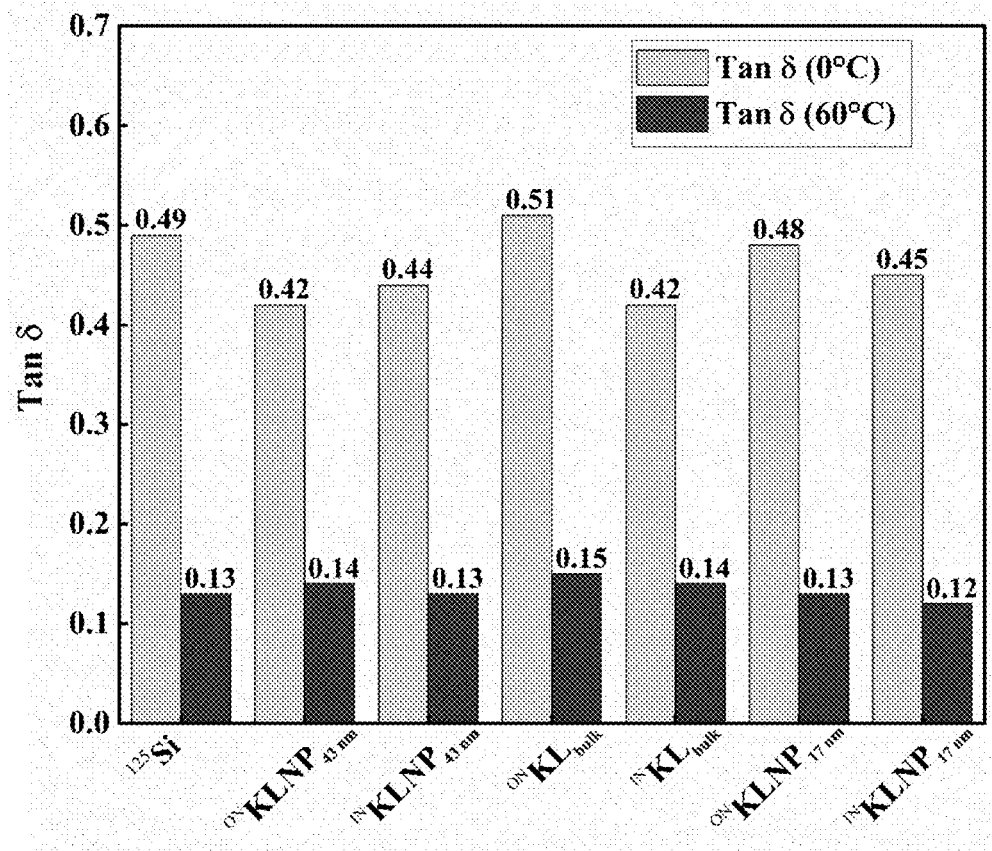
FIG. 32 is the tan δ at 0° C. (wet grip indicator) and tan δ at 60° C. (rolling resistance indicator) of the rubber composition.

FIG. 32 illustrates the loss tangent of all the rubber compounds. Loss tangent/tan δ is the ratio of the loss modulus (E") and E'. tan δ represents the energy loss in rubber compounds during dynamic strain. In automotive tire applications, change in tan δ influences the tire performance: skid resistance/wet grip (when measured at 0° C.) and rolling resistance (when measured at 60° C.). The low tan δ at 50° C. to 80° C. indicates low filler-filler interaction and better rolling resistance which is account for energy-saving and fuel consumption. The high tan δ at −20° C. to 0° C. indicates high filler-filler interactions and better-wet grip which ensure safety. The combination of low tan δ at 60° C. and high tan δ at 0° C. is desirable for high-performance automotive tires. FIG. 32 displays that incorporation of KL maintains the tan δ at 60° C., i.e., 0.13±0.01 and, there is only a marginal modulation of tan δ at 0° C., i.e., 0.46±0.04. Overall, The KL compounds sustain the high-performance tire indicators.

Thermal Stability

Figure 33:
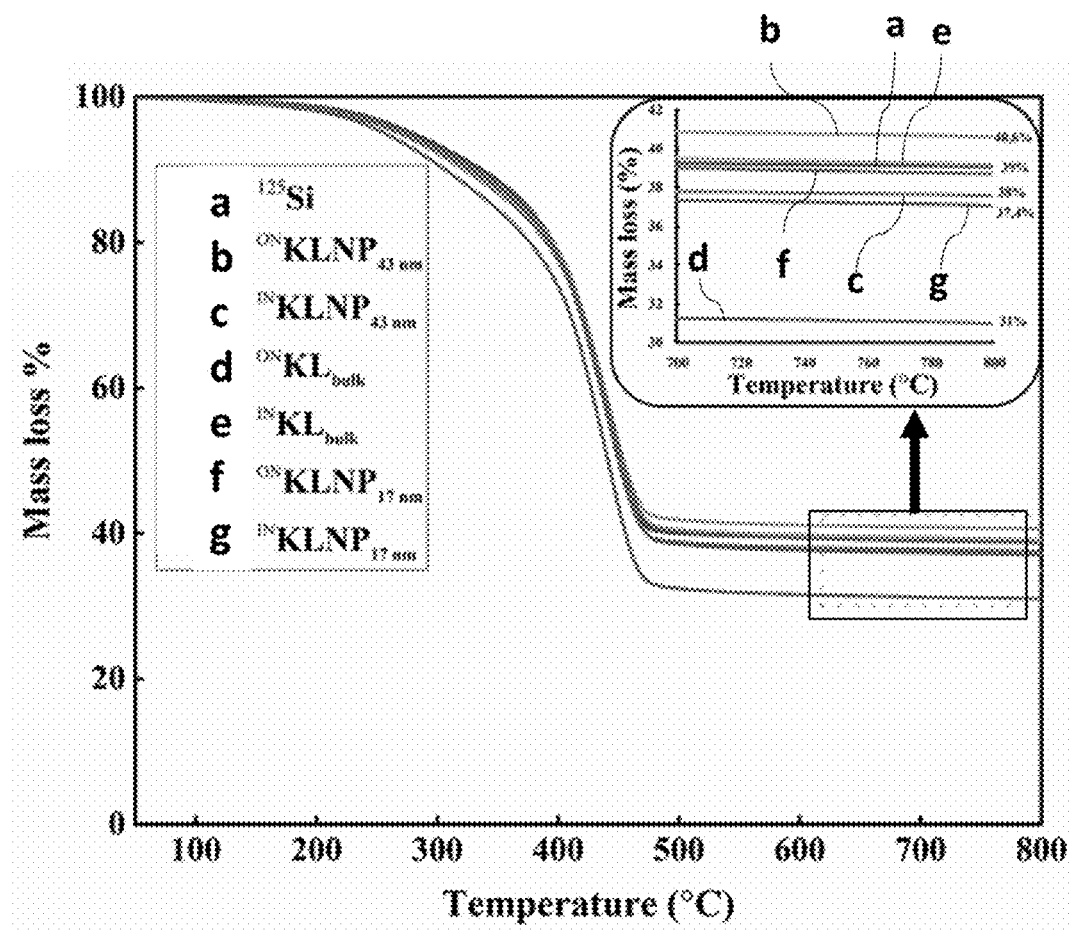
FIG. 33 is a thermogravimetric analysis of the rubber composition.

FIG. 33 indicates that there is no significant change in the thermal degradation pattern of all the rubber compositions. The char yield of most of the compounds is around 39±1% except $^{ON}KLNP_{bulk}$ 31%.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A rubber composition comprising at least rubber and reinforcement materials, the reinforcement materials comprising silica particles and Kraft lignin nanoparticles, wherein the phr ratio between the silica particles and Kraft lignin nanoparticles is ranging between 3 and 20; wherein the Kraft lignin nanoparticles have an average diameter size ranging between 10 and 100 nm as determined by scanning electron microscopy, and wherein the Kraft lignin nanoparticles have a glass transition temperature of at least 150° C. as determined by Differential Scanning Calorimetry.

2. The rubber composition of claim 1, wherein the Kraft lignin nanoparticles have a single glass transition temperature of at least 150° C.; or wherein the Kraft lignin nanoparticles have a first and a second glass transition temperature with the first glass transition temperature ranging between 110° C. and 130° C. and the second glass transition temperature of at least 150° C.

3. The rubber composition of claim 1, wherein the content of silica particles is ranging between 90 phr and 150 phr.

4. The rubber composition of claim 1, wherein the content of the reinforcement materials is ranging between 100 phr and 180 phr.

5. The rubber composition of claim 1, wherein the silica particles are made of or comprise amorphous silica.

6. The rubber composition of claim 1, wherein it further comprises one or more process oils selected from treated distillate aromatic extracts, mild extracted solvate or treated residual aromatic extracts.

7. The rubber composition of claim 1, wherein it further comprises one or more process oils present in a content ranging between 5 phr and 50 phr.

8. The rubber composition of claim 1, wherein it further comprises one or more process oils and the phr ratio between the reinforcement materials and the one or more process oils is ranging between 3.5:1 and 8:1, and wherein the weight average molecular weight of said at least one rubber is ranging between 400,000 g/mol and 1,000,000 g/mol as determined by GPC according to ASTM D5296-11.

9. The rubber composition of claim 1, wherein the Kraft lignin nanoparticles have a Young's modulus ranging between 1.0 GPa and below 3.0 GPa as determined by Atomic Force Microscopy or between 3.0 GPa and 6.0 GPa.

10. The rubber composition of claim 1, wherein said rubber is or comprises styrene-butadiene rubber.

11. The rubber composition of claim 10, wherein said styrene-butadiene rubber has a styrene microstructure content within a range of 20 wt. % to 50 wt. % based on the total weight of the styrene-butadiene rubber and a vinyl microstructure content within a range of 10 wt. % to 50 wt. % based on the total weight of the styrene-butadiene rubber.

12. The rubber composition of claim 10, wherein said styrene-butadiene rubber has a glass transition temperature ranging between −50° C. and −85° C. and wherein the rubber composition further comprises from 15 phr to 40 phr of at least one hydrocarbon resin, from 5 phr to 25 phr of said one or more process oils, and wherein the sum of the amount of said at least one hydrocarbon resin and the amount of the one or more process oils is ranging between 35 phr and 50 phr.

13. The rubber composition of claim 12, wherein the rubber composition further comprises at least one polybutadiene rubber having a glass transition temperature which is ranging between −85° C. to −115° C.

14. A rubber composition comprising at least rubber, one or more process oils, and reinforcement materials, the reinforcement materials comprising silica particles and Kraft lignin nanoparticles, wherein the phr ratio between the silica particles and Kraft lignin nanoparticles is ranging between 3 and 20; wherein the Kraft lignin nanoparticles have a specific surface area ranging between 70 m$^2$/g and 430 m$^2$/g as determined by BET experiments; and wherein the Kraft lignin nanoparticles have a glass transition temperature of at least 150° C. as determined by Differential Scanning Calorimetry.

15. The rubber composition of claim 14, wherein the Kraft lignin nanoparticles have a transmittance to ken at a wavelength of 600 nm ranging between 40% and 80% as determined by absorption analysis.

16. The rubber composition of claim 14, wherein said rubber is or comprises one or more selected of styrene-butadiene rubber, neodymium polybutadiene rubber, polybutadiene rubber, cis-polybutadiene rubber, polyisoprene rubber, styrene-isoprene rubber, styrene-isoprene-butadiene rubber, ethylene propylene rubber, ethylene propylene diene monomer/butyl rubber, copolymer or blends of any of previously-mentioned rubbers.

17. The rubber composition of claim 14, wherein the Kraft lignin nanoparticles are present in a content ranging between 10 phr and 30 phr.

18. The rubber composition of claim 14, wherein the Kraft lignin nanoparticles have an average diameter size ranging between 10 and below 30 nm as determined by scanning electron microscopy or between 30 and 60 nm.

19. The rubber composition of claim 14, wherein said rubber composition is sulphur cured.

20. A tire with a tire tread, where said tire tread comprises a rubber composition according to claim 1.

* * * * *